(12) United States Patent
Tatara et al.

(10) Patent No.: US 11,932,166 B2
(45) Date of Patent: Mar. 19, 2024

(54) ROAD SURFACE DRAWING SYSTEM, LAMP SYSTEM, AND VEHICLE DISPLAY SYSTEM

(71) Applicant: KOITO MANUFACTURING CO., LTD., Tokyo (JP)

(72) Inventors: Naoki Tatara, Shizuoka (JP); Kiyotaka Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 13 days.

(21) Appl. No.: 17/900,799

(22) Filed: Aug. 31, 2022

(65) Prior Publication Data

US 2022/0410795 A1    Dec. 29, 2022

Related U.S. Application Data

(63) Continuation of application No. PCT/JP2021/007941, filed on Mar. 2, 2021.

(30) Foreign Application Priority Data

Mar. 3, 2020 (JP) .............................. 2020-036076
Mar. 3, 2020 (JP) .............................. 2020-036077

(Continued)

(51) Int. Cl.
*B60Q 1/50* (2006.01)
*B60Q 1/14* (2006.01)

(52) U.S. Cl.
CPC .......... *B60Q 1/507* (2022.05); *B60Q 1/1423* (2013.01); *B60Q 1/5037* (2022.05); *B60Q 1/545* (2022.05);

(Continued)

(58) Field of Classification Search
CPC .... B60Q 1/507; B60Q 1/1423; B60Q 1/5037; B60Q 1/545; B60Q 1/547; B60Q 1/549;
(Continued)

(56) References Cited

U.S. PATENT DOCUMENTS

2016/0297357 A1* 10/2016 Hayakawa .............. F21S 41/16
2017/0067609 A1*  3/2017 Ichikawa .............. F21S 41/151
(Continued)

FOREIGN PATENT DOCUMENTS

JP    2004069419 A     3/2004
JP    2016199072 A    12/2016
(Continued)

OTHER PUBLICATIONS

International Preliminary Report on Patentability Chapter I (PCT/IB/373 and PCT/ISA/237) with translation dated Sep. 6, 2022 by The International Bureau of WIPO in corresponding International Patent Application No. PCT/JP2021/007941. (11 pages).

(Continued)

*Primary Examiner* — Omeed Alizada
(74) *Attorney, Agent, or Firm* — BUCHANAN INGERSOLL & ROONEY PC

(57) ABSTRACT

A road surface drawing system includes a road surface drawing lamp that is provided in a vehicle and illuminates a road surface with a beam, and a controller that controls the road surface drawing lamp and draws, with a beam BM, a pattern PTN on the road surface ahead of the vehicle. The (Continued)

controller draws a pattern PTN instructing the vehicle to stop if a signal state of an upcoming traffic signal is a red light.

3 Claims, 25 Drawing Sheets

(30) Foreign Application Priority Data

Mar. 23, 2020 (JP) .................................. 2020-050871
Mar. 30, 2020 (JP) .................................. 2020-061148

(52) U.S. Cl.
CPC ............. *B60Q 1/547* (2022.05); *B60Q 1/549* (2022.05); *B60Q 2400/50* (2013.01)

(58) Field of Classification Search
CPC ...... B60Q 2400/50; G08G 1/09; G08G 1/123; G08G 1/00; G08G 1/095; F21W 2103/60; F21Y 2115/10; F21Y 2115/30; F21S 43/14; F21S 43/15; F21S 43/31
See application file for complete search history.

(56) References Cited

U.S. PATENT DOCUMENTS

| | | | |
|---|---|---|---|
| 2018/0257547 A1* | 9/2018 | Suzuki | B60Q 1/547 |
| 2020/0010012 A1* | 1/2020 | Ichikawa | F21S 41/32 |
| 2020/0063938 A1* | 2/2020 | Kurashige | G02B 27/30 |

FOREIGN PATENT DOCUMENTS

| | | |
|---|---|---|
| JP | 2017101992 A | 6/2017 |
| JP | 2018149858 A | 9/2018 |
| JP | 2019066885 A | 4/2019 |
| JP | 2019215710 A | 12/2019 |
| WO | 2015133302 A1 | 9/2015 |

OTHER PUBLICATIONS

International Search Report (PCT/ISA/210) with translation dated Apr. 27, 2021, by the Japan Patent Office as the International Searching Authority for International Application No. PCT/JP2021/007941. (6 pages).

* cited by examiner

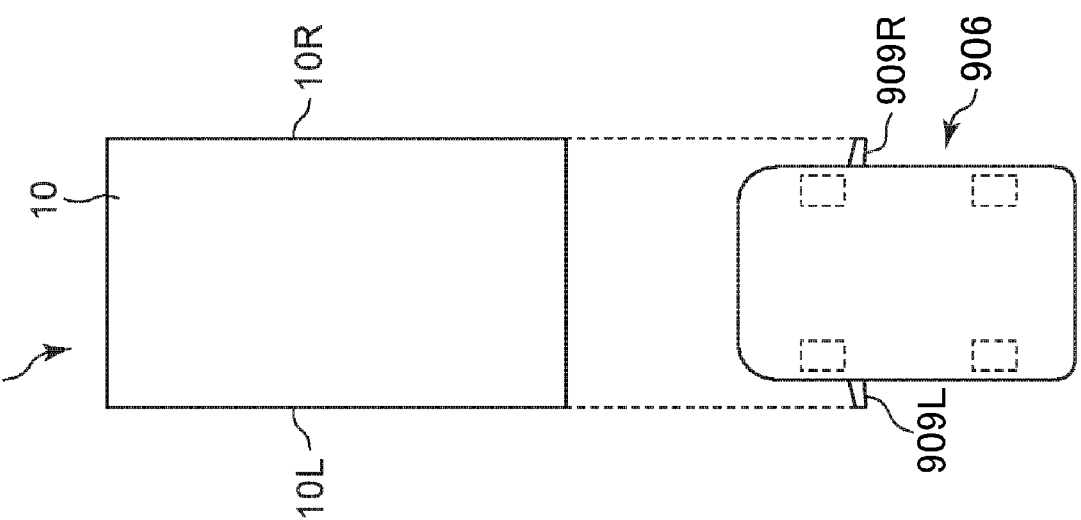
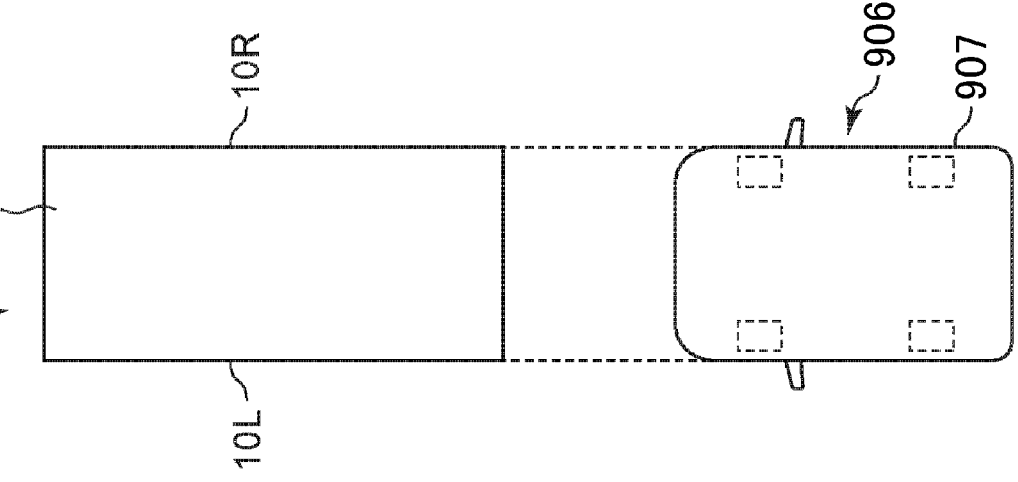
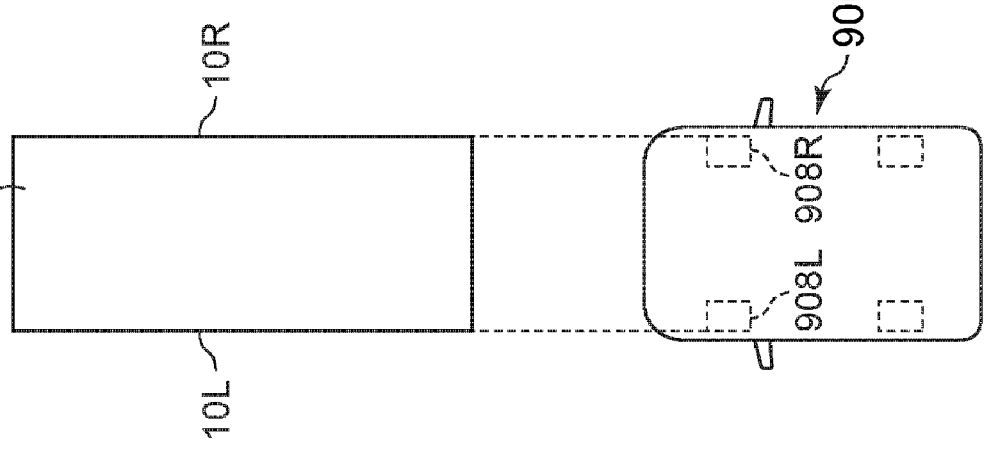

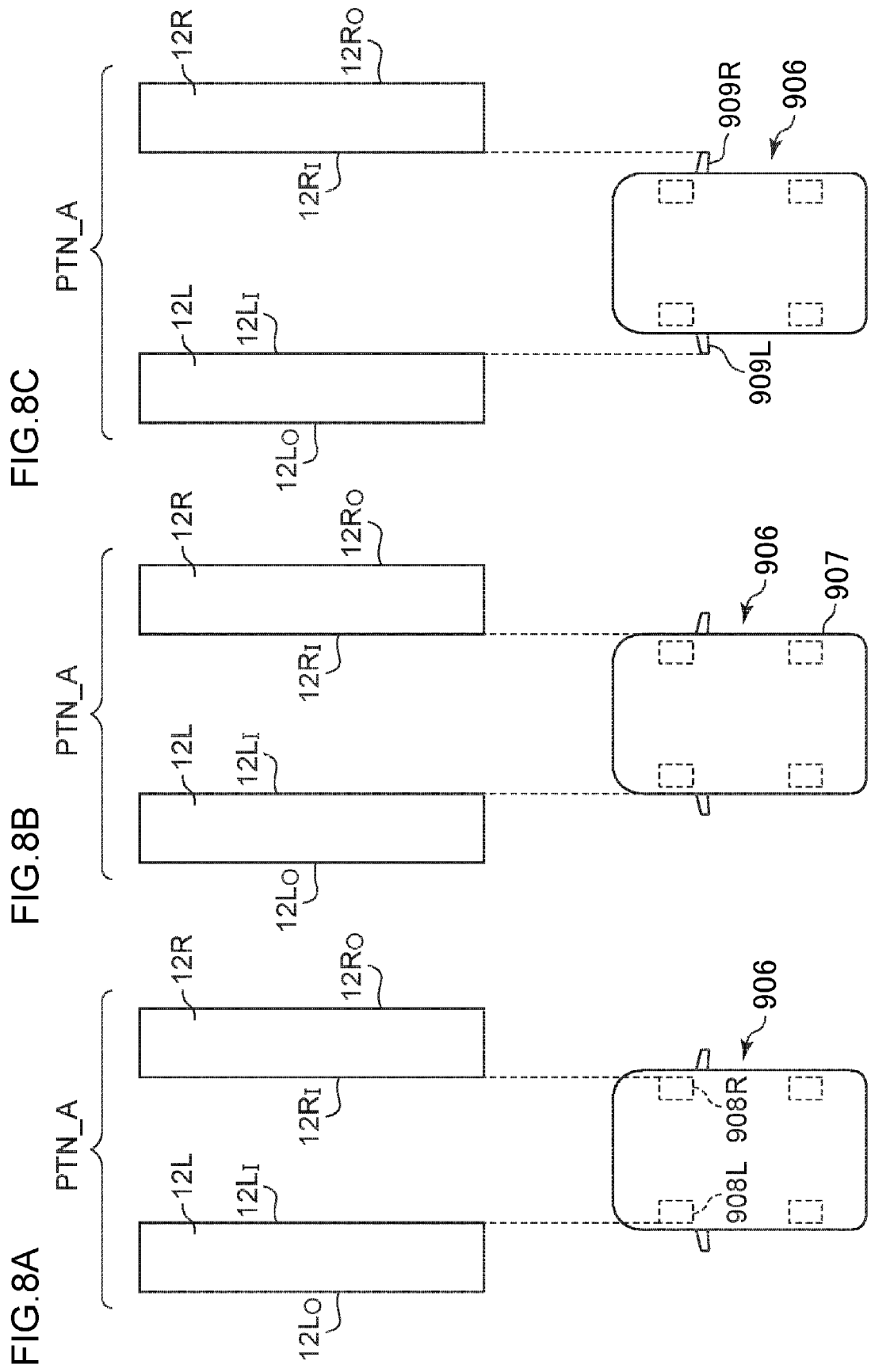

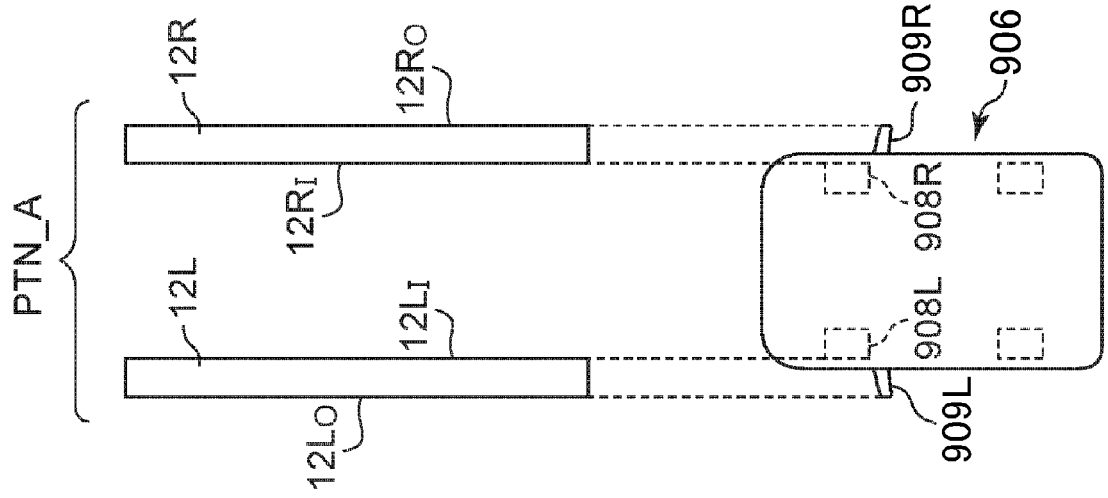
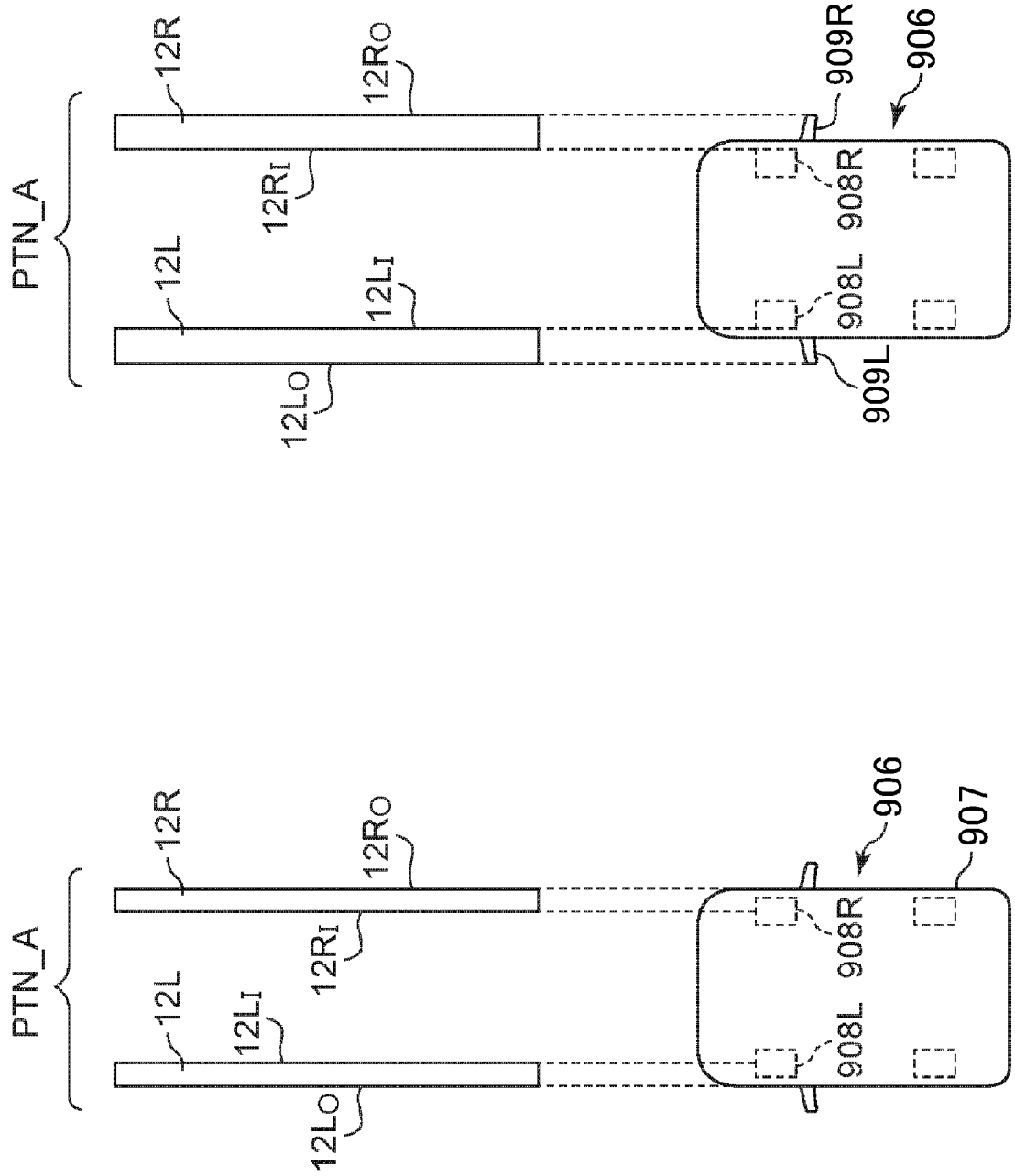

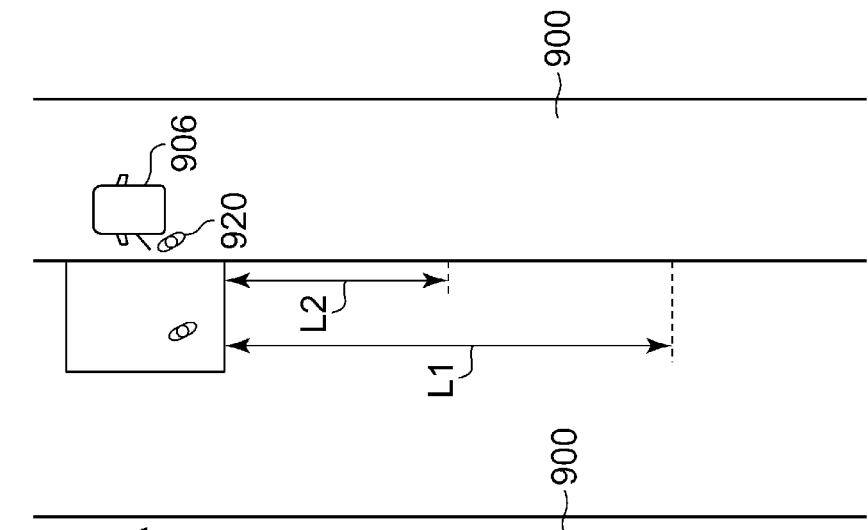
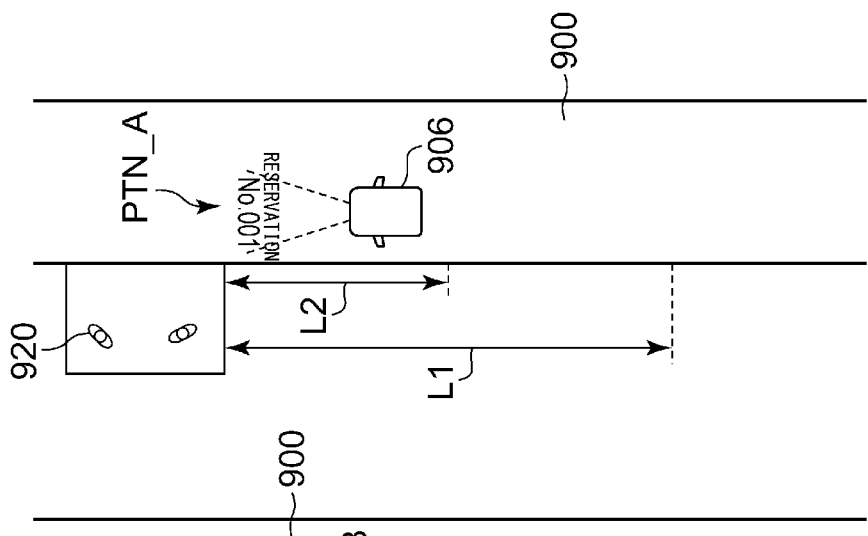
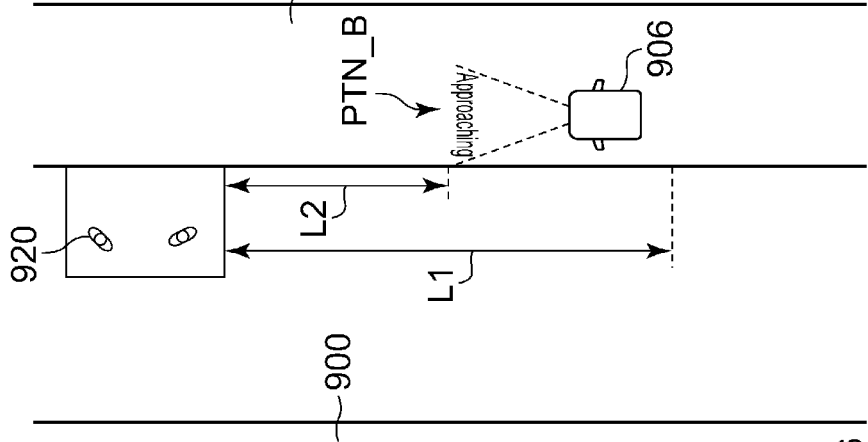
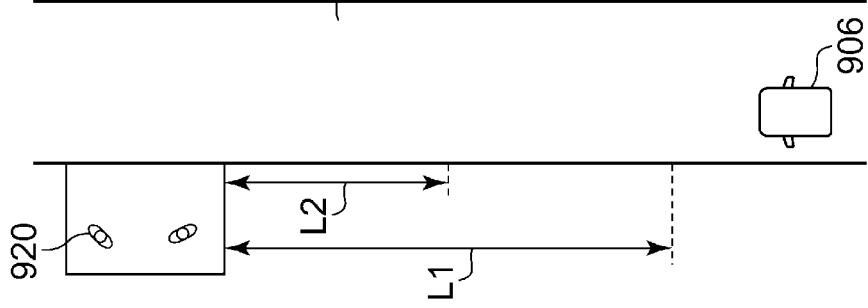

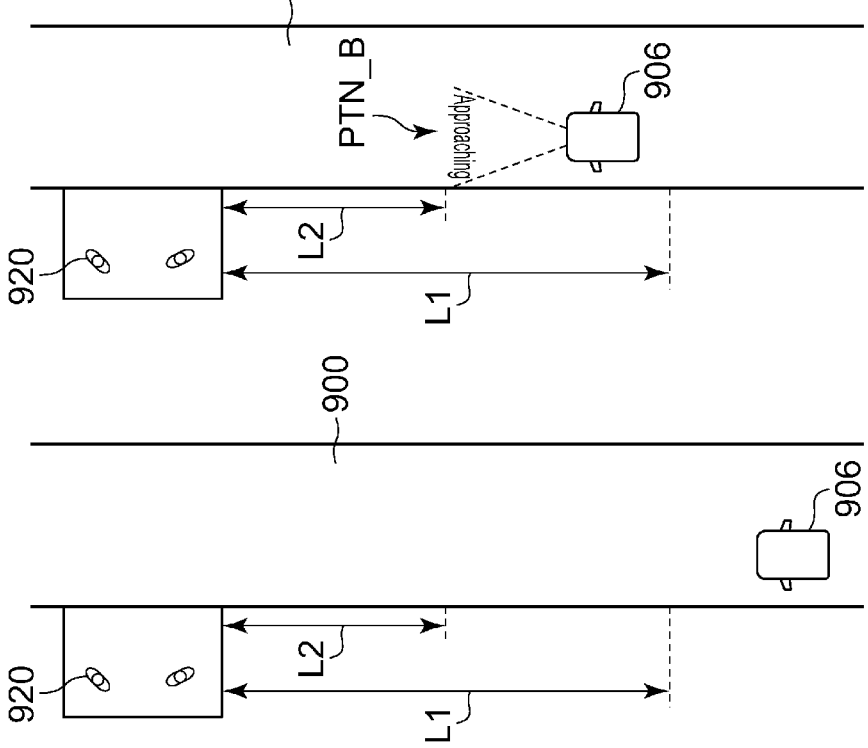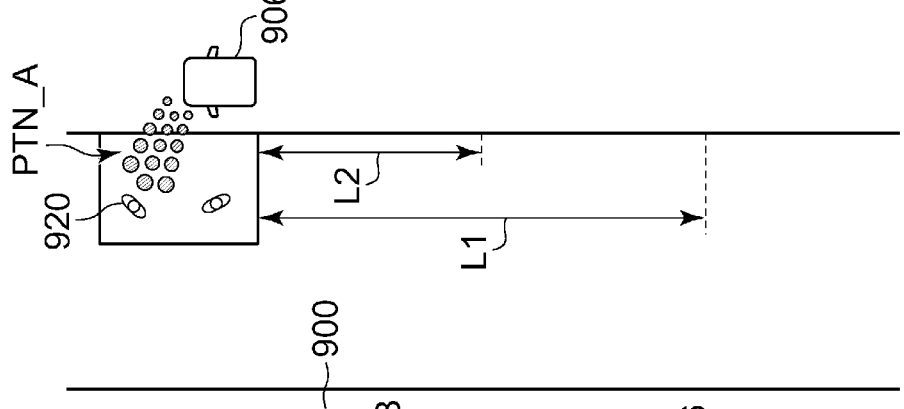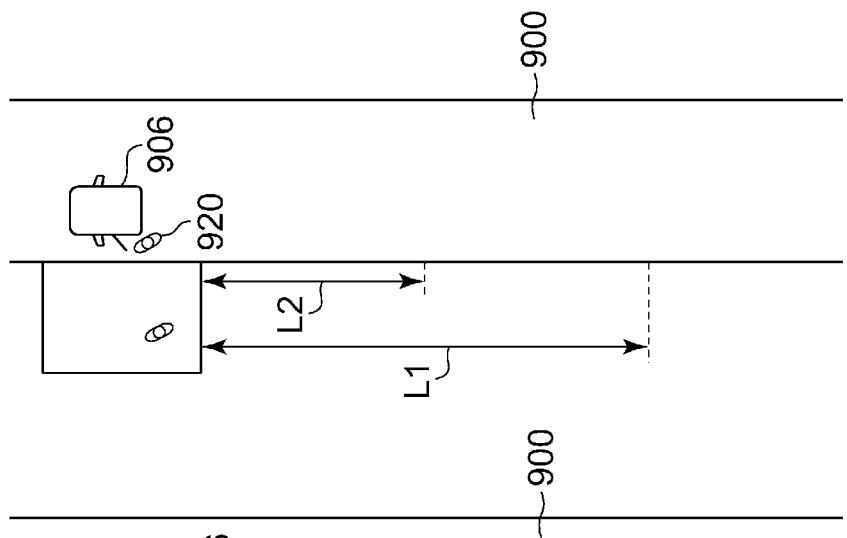

ROAD SURFACE DRAWING SYSTEM, LAMP SYSTEM, AND VEHICLE DISPLAY SYSTEM

BACKGROUND OF THE INVENTION

1. Field of the Invention

The present disclosure relates to road surface drawing systems, lamp systems, and vehicle display systems.

2. Description of the Related Art (1) (2) (4) Vehicle lamps are increasingly becoming of higher functionality, and as one example of such, a lamp that illuminates a road surface with a pattern of a light beam and draws a figure or a character has been proposed.

(3) In recent years, a car-sharing service where a user reserves and uses a shared vehicle or ride-sharing where a plurality of users ride in one vehicle is becoming widespread. The spread of car-sharing is expected to accelerate in near-future mobilities in which automatic driving can be attained.

SUMMARY OF THE INVENTION (1) A first aspect of the present disclosure has been made in view of such circumstances, and one exemplary object of one mode of this aspect is to provide a road surface drawing system that contributes to traffic safety.

A road surface drawing system according to one mode of the first aspect of the present disclosure includes a road surface drawing lamp that is provided in a vehicle and illuminates a road surface with a beam, and a controller that controls the road surface drawing lamp and draws, with the beam, a pattern on the road surface ahead of the vehicle. The controller draws a pattern instructing the vehicle to stop if a signal state of an upcoming traffic signal is a red light.

Another mode of the first aspect of the present disclosure also provides a road surface drawing system. This road surface drawing system includes a road surface drawing lamp that is provided in an infrastructure facility and illuminates a road surface with a beam, and a controller that controls the road surface drawing lamp and draws, with the beam, a pattern on the road surface before a traffic signal. The controller draws a pattern instructing a vehicle to stop if a signal state of the traffic signal is a red light.

(2) A second aspect of the present disclosure has been made in view of the above circumstances, and one exemplary object of one mode of this aspect is to provide a lamp system that contributes to traffic safety.

A lamp system according to one mode of the second aspect of the present disclosure includes a road surface drawing lamp that illuminates a road surface with a beam, and a controller that controls the road surface drawing lamp and draws, with the beam, a pattern that includes a figure of which a lengthwise direction matches a traveling direction and an edge indicates a future course of a predetermined portion of a vehicle.

Another mode of the second aspect of the present disclosure also provides a lamp system. This lamp system includes a road surface drawing lamp that illuminates a road surface with a beam, and a controller that controls the road surface drawing lamp and draws, with the beam, a pattern that includes two figures of each of which a lengthwise direction matches a traveling direction and an inner edge or an outer edge indicates a future course of a predetermined portion of a vehicle.

(3) If a car-sharing vehicle is capable of automatic driving, a user does not need to go to a parking lot to pick up the vehicle, and the expectation is that the car-sharing vehicle will come to a designated location to pick up the user. In this case, if a large number of people are at a designated location, this makes it hard to identify whom the car-sharing vehicle is there for. Meanwhile, if a large number of vehicles are parked at a designated location, the user may not realize that the car-sharing vehicle has come to pick up the user. Therefore, the importance of communication between the user and the vehicle at the time of vehicle pickup is expected to increase. Such communication can be achieved through a drawing on a road surface, but a drawing on a road surface may annoy people in the surroundings.

Such circumstances are not limited to a car-sharing vehicle and may arise also when, for example, a manual or automatic driving ride-share car or taxi picks up a user.

A third aspect of the present disclosure has been made in view of such circumstances, and one exemplary object of one mode of this aspect is to provide a vehicle display system capable of reducing annoyance that can be caused to people in the surroundings while achieving communication with a user.

A vehicle display system according to one mode of the third aspect of the present disclosure is a vehicle display system to be provided in a vehicle, and the vehicle display system includes a road surface drawing lamp that illuminates a road surface with a beam, and a controller that controls the road surface drawing lamp to draw, with the beam, a pattern informing a predetermined person that the vehicle has arrived and to turn off the pattern in response to a predetermined action of the person.

Another mode of the third aspect of the present disclosure also provides a vehicle display system. This vehicle display system is a vehicle display system to be provided in a vehicle, and the vehicle display system includes a display so provided as to be visible from an outside of the vehicle, and a controller that controls the display to display information informing a predetermined person that the vehicle has arrived and to turn off the information in response to a predetermined action of the person.

(4) A fourth aspect of the present disclosure has been made in view of such circumstances, and one exemplary object of one mode of this aspect is to provide a lamp system that contributes to people's safety at the time of a disaster.

A lamp system according to one mode of the fourth aspect of the present disclosure includes a road surface drawing lamp that is provided in a vehicle and illuminates a road surface with a beam, and a controller that, in response to receiving information pertaining to a disaster, controls the road surface drawing lamp and draws a predetermined pattern with the beam.

Another mode of the fourth aspect of the present disclosure also provides a lamp system. This lamp system includes a first road surface drawing lamp that is provided at front left of a vehicle and illuminates a road surface with a first beam, a second road surface drawing lamp that is provided at front right of the vehicle and illuminates the road surface with a second beam, and a controller that, in response to receiving information pertaining to a disaster, controls the first road surface drawing lamp to draw a first pattern with the first beam and controls the second road surface drawing lamp to draw a second pattern different from the first pattern with the second beam.

It is to be noted that any arbitrary combination or rearrangement of the above-described structural components and so forth is effective as and encompassed by the present embodiments. Moreover, this summary does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A to 7C each illustrate an example of a pattern that a light distribution variable lamp draws on a road surface;

FIGS. 8A to 8C each illustrate another example of a pattern that a light distribution variable lamp draws on a road surface;

FIGS. 9A and 9B each illustrate yet another example of a pattern that a light distribution variable lamp draws on a road surface;

FIGS. 15A to 15D are illustrations for describing an example of how a vehicle display system draws a pattern;

FIGS. 16A to 16D are illustrations for describing another example of how a vehicle display system draws a pattern;

DETAILED DESCRIPTION OF THE INVENTION

Figure 1:
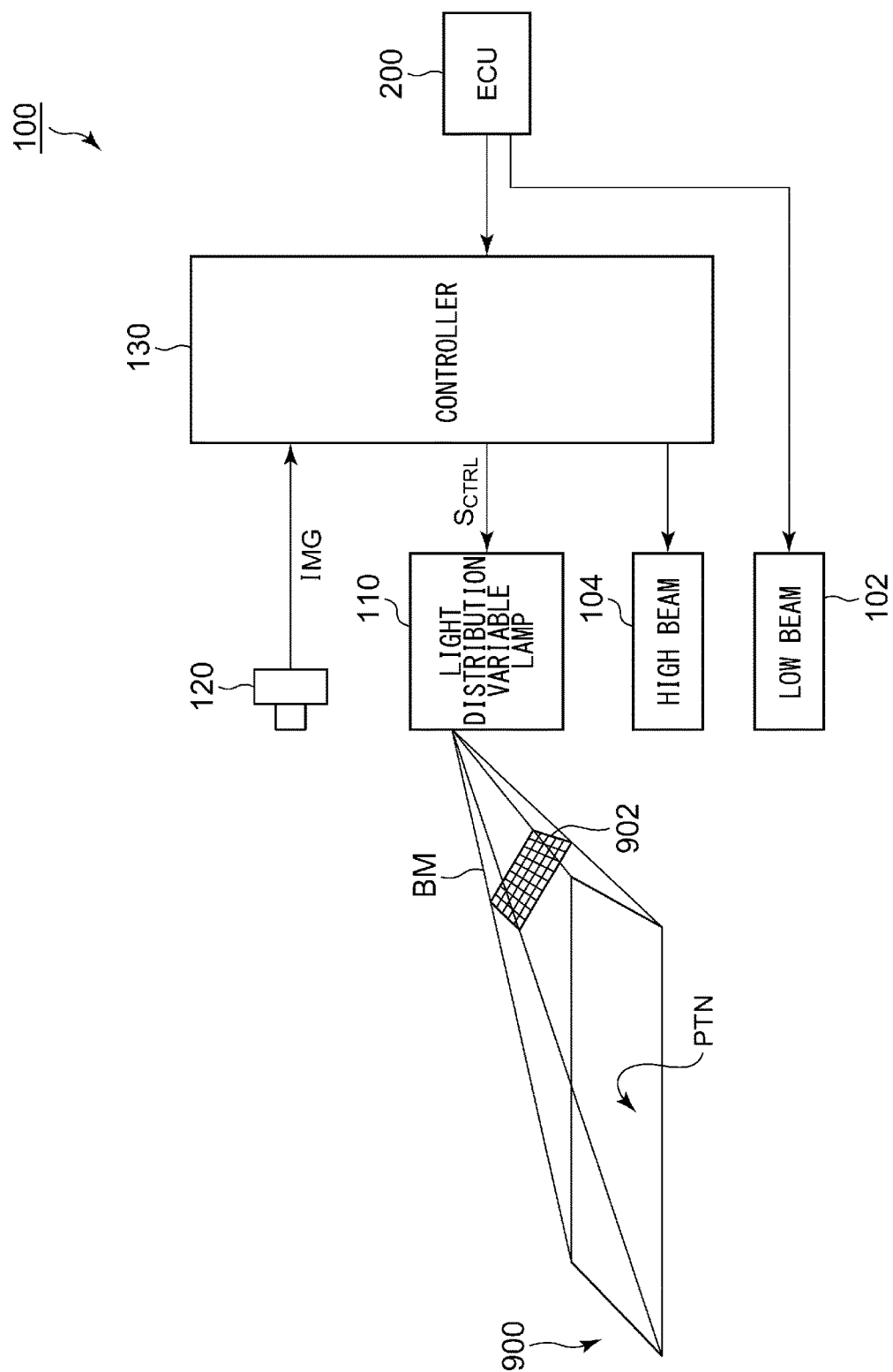
FIG. 1 is a block diagram of a lamp system according to Embodiment 1.

I First Aspect of the Present Disclosure

Hereinafter, a first aspect of the present disclosure will be described based on an exemplary embodiment and with reference to drawings. The embodiment is illustrative in nature and is not intended to limit the disclosure or the invention. Not all the features and combinations thereof described according to the embodiment are necessarily essential to the disclosure or the invention. Identical or equivalent constituent elements, members, and processes illustrated in the drawings are given identical reference characters, and duplicate description thereof will be omitted, as appropriate.

Embodiment 1

FIG. 1 is a block diagram of a lamp system (road surface drawing system) 100 according to Embodiment 1. The lamp system 100 includes a light distribution variable lamp (road surface drawing lamp) 110, a camera 120, a controller 130, a low beam 102, and a high beam 104. These components may all be housed within a single housing, or some of these components may be provided outside a housing, that is, provided in a vehicle.

According to the present embodiment, the light distribution variable lamp 110 is provided additionally to and separately from the low beam 102 and the high beam 104. Hence, the light distribution variable lamp 110 may also be referred to as an additional beam.

The light distribution variable lamp 110 receives, from the controller 130, a control signal $S_{CTRL}$ instructing a pattern PTN to be drawn on a road surface 900. Then, the light distribution variable lamp 110 illuminates the road surface 900 ahead of the vehicle with a beam BM having an intensity distribution 902 corresponding to the control signal $S_{CTRL}$ and draws the pattern PTN on the road surface 900.

There is no particular limitation on the configuration of the light distribution variable lamp 110, and the light distribution variable lamp 110 may include, for example, a semiconductor light source, such as a laser diode (LD) or a light-emitting diode (LED), and a lighting circuit that drives the semiconductor light source to turn it on. To form an illuminance distribution corresponding to a pattern PTN, the light distribution variable lamp 110 may include a pattern forming device of a matrix type, such as a digital mirror device (DMD) or a liquid-crystal device. Alternatively, the light distribution variable lamp 110 may be an array of light-emitting elements (also called p-LED).

An illumination area that the light distribution variable lamp 110 illuminates is set to cover at least the road surface 900. The illumination area that the light distribution variable lamp 110 illuminates may overlap a part of an illumination area of the low beam 102. Hence, the light distribution variable lamp 110 may form a pattern PTN with an illuminance higher than that of the low beam.

The camera 120 captures an image ahead of the vehicle. The controller 130 may control a pattern PTN that the light distribution variable lamp 110 is to draw on the road surface 900, based on an image captured by the camera 120 (hereinafter, referred to as a camera image IMG).

Like the light distribution variable lamp 110, the high beam 104 may also be capable of varying its light distribution. In this case, the controller 130 may control the light distribution of the high beam 104 based on a camera image IMG.

The controller 130 controls the light distribution variable lamp 110. The controller 130 can be formed by a digital processor. The controller 130 may be formed, for example but not limited to, by a combination of a microcomputer including a CPU and a software program or by a field-programmable gate array (FPGA) or an application specific IC (ASIC).

To be more specific, the controller 130 controls the light distribution variable lamp 110 and draws a pattern PTN for drive assistance on the road surface 900 with a beam BM. There is no particular limitation on a pattern PTN to be drawn, and, for example, a legal speed limit, a road sign, or the like may be drawn for the driver's easy recognition. Alternatively, the traveling direction of the host vehicle may be drawn to assist drivers of other vehicles. In any case, a pattern PTN does not merely provide illumination like the low beam but includes information to be presented to the driver or other participants in the traffic.

An electronic control unit (ECU) 200 controls the lamp system 100 as a whole. For example, the ECU 200 generates a command to, for example, turn on or off the light distribution variable lamp 110. Moreover, the ECU 200 transmits information necessary for light distribution control to the controller 130.

The above describes a basic configuration of the lamp system 100. Next, how the lamp system 100 draws a pattern on a road surface will be described specifically based on some examples.

Example 1

The controller 130 draws, as a pattern PTN characteristic to the lamp system 100 according to Embodiment 1, a pattern PTN_A instructing the vehicle to stop, in accordance with a signal state of an upcoming traffic signal that the vehicle provided with the lamp system 100 should follow (hereinafter, simply referred to as an upcoming traffic signal). In the present example, the controller 130 draws a pattern PTN_A instructing the vehicle to stop, if the signal state of the upcoming traffic signal is a red light. The signal state of the upcoming traffic signal may be determined based on a camera image IMG, or information indicating the signal state may be received from the traffic signal directly or via the ECU 200 if the traffic signal has communication capability.

FIGS. 2A to 2D are illustrations for describing how the lamp system 100 draws a pattern PTN_A. FIGS. 2A to 2D show a driving scenario in time series.

Figure 2:
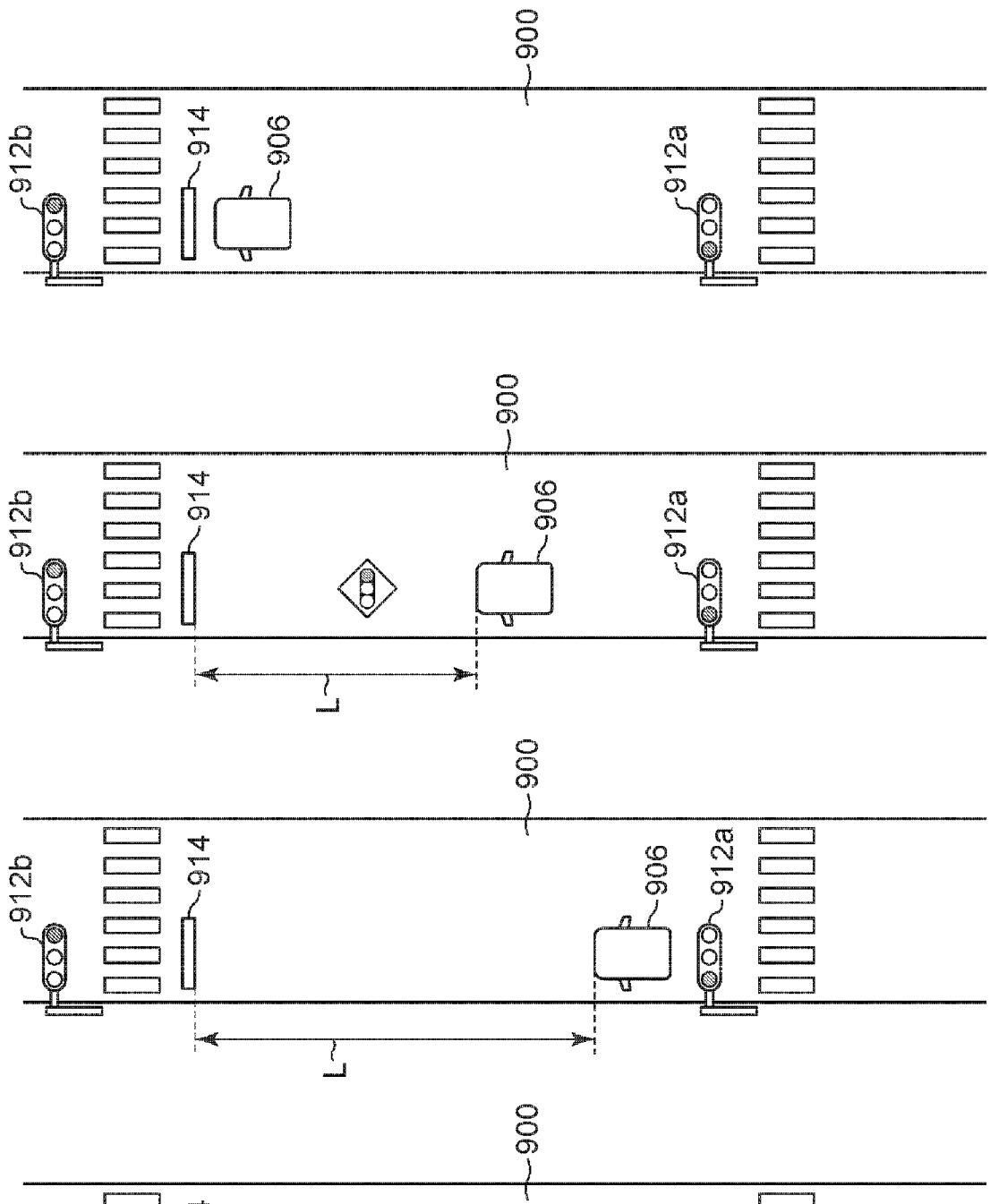
FIGS. 2A to 2D are illustrations for describing how a lamp system draws a pattern.

In FIG. 2A, the signal state of an upcoming traffic signal 912a is a green light, and thus no pattern PTN_A is drawn on the road surface 900.

In FIG. 2B, the signal state of an upcoming traffic signal 912b is a red light, but no pattern PTN_A is drawn on the road surface 900. No pattern PTN_A is drawn even if the signal state of the upcoming traffic signal 912b is a red light if, for example, the distance from a vehicle 906 to the upcoming traffic signal 912b is too large to identify that the signal state is a red light. Moreover, no pattern PTN_A is drawn even if the signal state of the upcoming traffic signal 912b being a red light has been identified if, for example, a distance L from the vehicle 906 to a stop line 914 for the upcoming traffic signal 912b exceeds a predetermined threshold, that is, if the stop line 914 is too far. This configuration can help prevent traffic congestion caused by vehicles unnecessarily decelerating.

In FIG. 2C, the signal state of the upcoming traffic signal 912b is a red light, and a pattern PTN_A is drawn on the road surface 900 ahead of the vehicle 906. There is no particular limitation on the pattern PTN_A, and in this example, the pattern PTN_A includes a figure depicting a traffic signal sign. Of the pattern PTN_A, a portion corresponding to the red light may be drawn in red, and portions corresponding to the green light and the yellow light may be drawn, for example, in white or may not be drawn at all. The pattern PTN_A may be displayed flashing. The pattern PTN_A may include, in addition to or in place of the figure depicting a traffic signal sign, characters such as "STOP" or characters indicating the distance to the upcoming traffic signal. In any case, drawing the pattern PTN_A when the signal state of an upcoming traffic signal is a red light can inform the driver of the vehicle 906 that the signal state of the upcoming traffic signal is a red light, and this can keep the driver from failing to notice the red light.

The pattern PTN_A may be drawn if the signal state of the upcoming traffic signal 912b being a red light has been identified and if the distance to the stop line 914 for the upcoming traffic signal 912b is no greater than the predetermined threshold.

Moreover, the pattern PTN_A may be drawn if it is estimated that, while the signal state of the upcoming traffic signal 912b being a red light has been identified, the driver has not noticed the red light.

Specifically, the pattern PTN_A may be drawn, for example, when there is a likelihood that the vehicle 906 will go over the stop line 914 if the vehicle 906 continues to travel as it has been. For example, it may be determined that the vehicle 906 is likely to go over the stop line 914 if the braking distance has exceeded the distance L to the stop line 914. Moreover, the pattern PTN_A may be drawn if, for example, the distance L from the vehicle 906 to the stop line 914 is no greater than a predetermined threshold and if the vehicle speed exceeds a predetermined speed limit.

In FIG. 2D, the vehicle 906 has stopped before the stop line 914, and the pattern PTN_A has been turned off.

Example 2

The controller 130 draws, as a pattern PTN characteristic to the lamp system 100 according to Embodiment 1, in addition to the pattern PTN_A instructing the vehicle to stop, a pattern PTN_B for communicating, to a pedestrian, a sense that the vehicle is decelerating, in response to detecting the pedestrian. Specifically, the controller 130 draws a pattern PTN_B whose animation speed changes in accordance with the vehicle speed, that is, whose animation speed decreases with a decrease in the vehicle speed. The controller 130 may detect a pedestrian based on a camera image IMG. Herein, the lamp system 100 may include a stereo camera, a ToF camera, LiDAR, or an infrared sensor, and based on their detection result, the controller 130 may detect a pedestrian.

Figure 3:
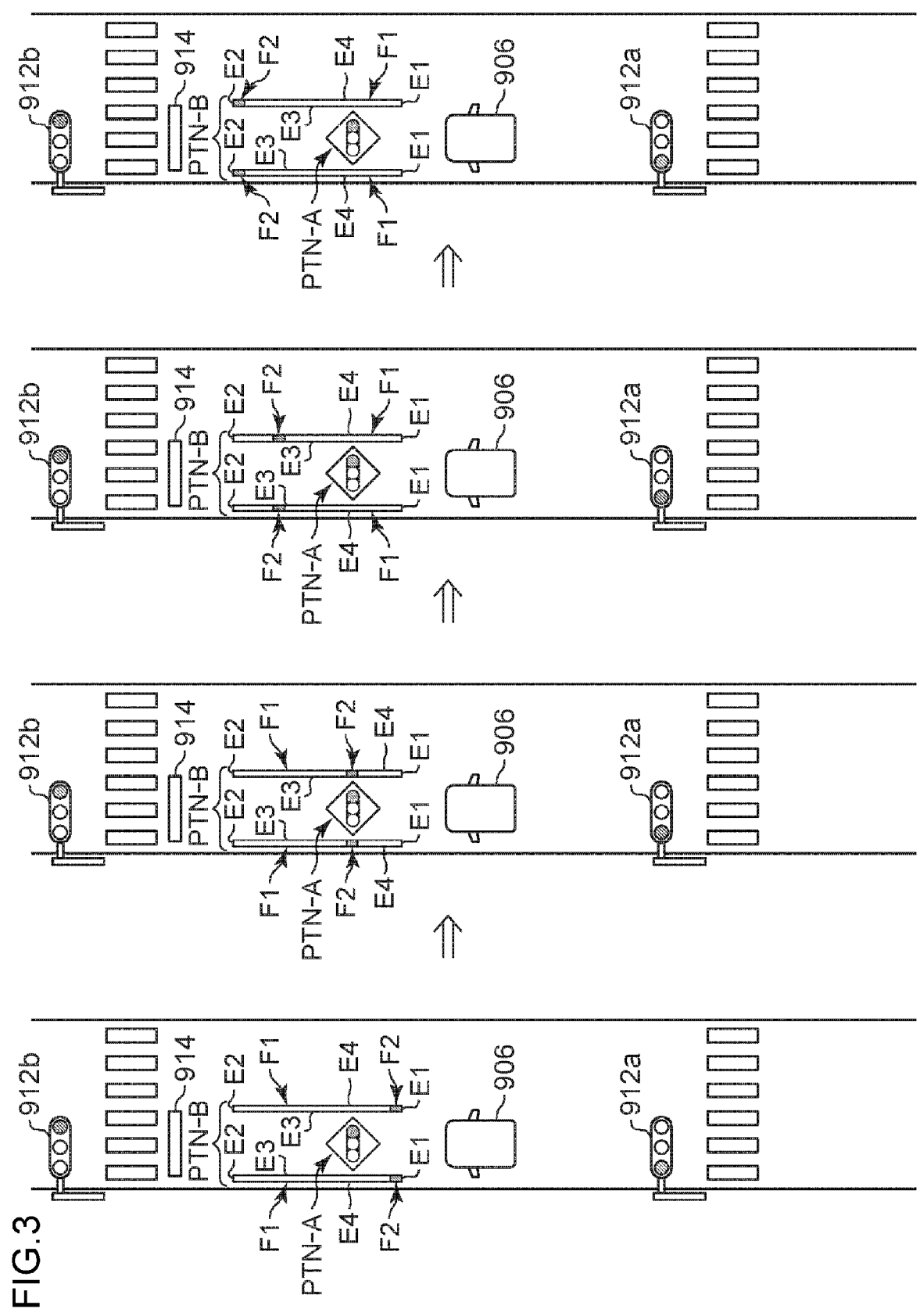
FIG. 3 is an illustration for describing how a lamp system draws a pattern.

FIG. 3 is an illustration for describing how the lamp system 100 draws a pattern PTN_B. FIG. 3 shows how the pattern PTN_B is animated. Although the vehicle 906 is moving in reality, the vehicle 906 is shown at the same position for simplifying the description.

In FIG. 3, the pattern PTN_B, in addition to the pattern PTN_A, is drawn since a pedestrian 910 has been detected. In this example, the pattern PTN_B includes two rectangular frame-shaped figures F1 that each extend in the traveling direction of the vehicle 906 (i.e., the lengthwise direction of each figure F1 matches the traveling direction) and two figures F2 drawn inside the respective figures F1. The figures F2 slide and move from trailing edges E1 of the respective figures F1 in the direction away from the vehicle 906 (i.e., toward leading edges E2 of the respective figures F1). The speed at which each figure F2 slides and moves changes in accordance with (e.g., in proportion to) the vehicle speed. Upon reaching the leading edges E2, the figures F2 partly disappear and eventually disappear from the figures F1. Then, new figures F2 appear at the trailing edges E1 of the respective figures F1. Inner edges E3 or outer edges E4 of the figures F1 may show the width of the vehicle 906. Specifically, the inner edges E3 or the outer edges E4 of the figures F1 may show the width of the vehicle body, the distance between predetermined portions of left and right tires, or the distance between predetermined portions of left and right mirrors.

Since the animation speed of the pattern PTN_B changes in accordance with the vehicle speed, when the vehicle 906 is decelerating, this deceleration can be felt by the pedestrian 910, and the pedestrian 910 can feel safe.

Next, some variations related to Embodiment 1 will be described.

(Variation 1-1)

The lamp system (road surface drawing system) 100 provided in the vehicle 906 draws a pattern PTN_A on the road surface 900 according to Embodiment 1. Alternatively, a road surface drawing system provided, for example, in an infrastructure facility, such as a traffic signal or a direction signboard, a traffic sign, or a utility pole provided near a traffic signal, may draw a pattern PTN_A.

Figure 4:
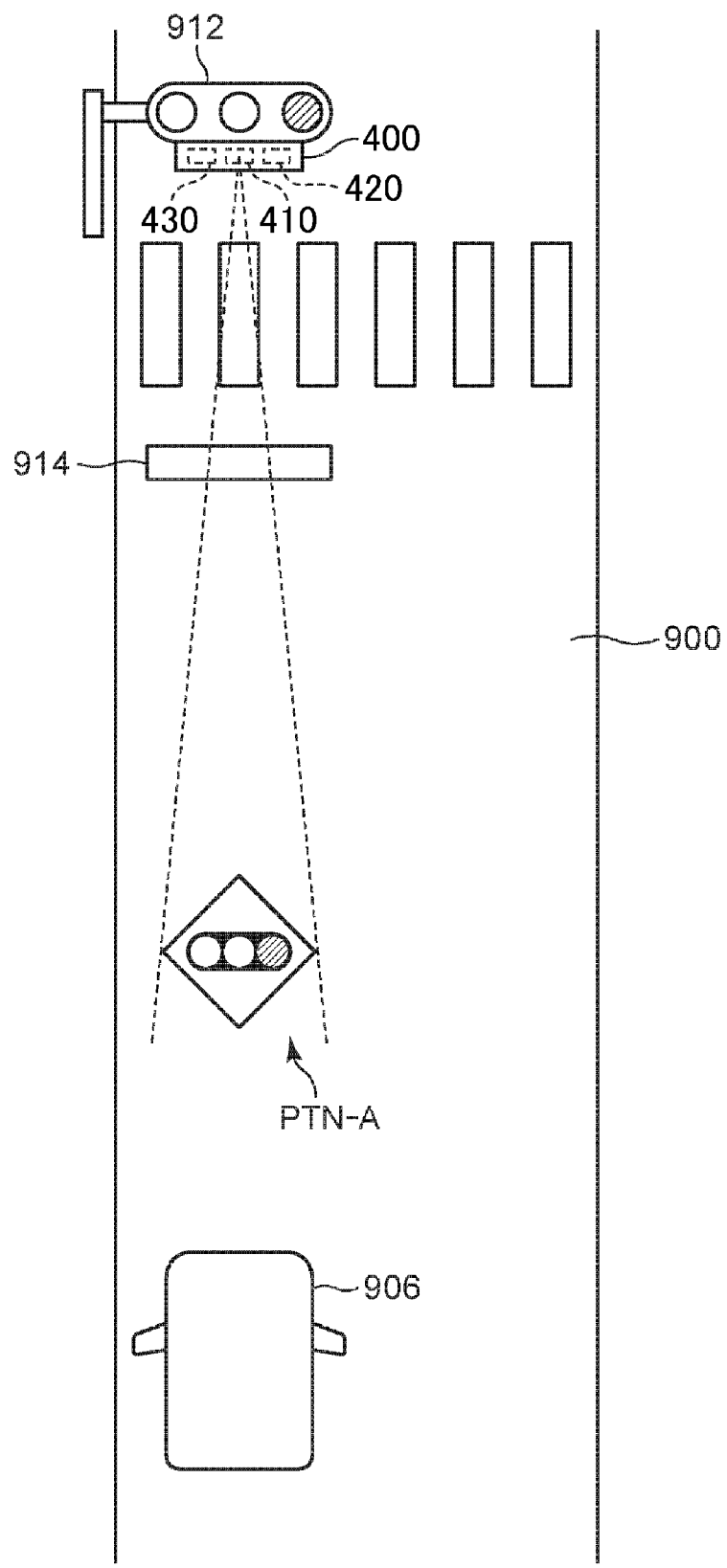
FIG. 4 is a schematic diagram illustrating a road surface drawing system according to a variation.

FIG. 4 is a schematic diagram illustrating a road surface drawing system 400 according to a variation. The road surface drawing system 400 is provided in a traffic signal 912, which is an infrastructure facility. The road surface drawing system 400 includes a light distribution variable lamp (road surface drawing lamp) 410, a camera 420, and a controller 430.

The light distribution variable lamp 410 has a configuration similar to the configuration of the light distribution variable lamp 110 according to Embodiment 1. The camera 420 captures an image of a space before the traffic signal 912. The controller 430 detects a vehicle traveling before the traffic signal 912 based on an image captured by the camera 420. Herein, the road surface drawing system 400 may include a stereo camera, a ToF camera, LiDAR, or an infrared sensor, and based on their detection result, the controller 430 may detect a vehicle.

The controller 430 controls the light distribution variable lamp 410. The controller 430 may be a controller that controls the signal state of the traffic signal 912 or another controller separate from such a controller. The controller 430 can be formed by a digital processor. The controller 430 may be formed, for example but not limited to, by a combination of a microcomputer including a CPU and a software program or by an FPGA or an ASIC.

To be more specific, the controller 430 controls the light distribution variable lamp 410 and draws a pattern PTN for drive assistance on the road surface 900 with a beam BM.

The controller 430, for example, draws a pattern PTN_A instructing the vehicle to stop on the road surface 900 before the traffic signal 912 if the signal state of the traffic signal 912 is a red light.

Meanwhile, the controller 430 may draw a pattern PTN_A instructing the vehicle to stop on the road surface 900 before the traffic signal 912, for example, if the controller 430 has detected the vehicle within a predetermined range before the traffic signal 912 and the signal state of the traffic signal 912 is a red light.

Like Embodiment 1, the present variation makes it possible to inform the driver of the fact that the signal state of the upcoming traffic signal is a red light and to keep the driver from failing to notice the red light. In addition, since the road surface drawing system 400 is provided in an infrastructure facility, all the vehicles can enjoy the advantages that the road surface drawing system 400 offers.

(Variation 1-2)

A pattern PTN_A instructing a vehicle to stop is drawn only if the signal state is a red light according to Embodiment 1 or the variation described above. Alternatively, a pattern PTN_A may start being drawn while the signal state is a yellow light. In a case where a pattern PTN_A is a figure depicting a traffic signal sign, when the signal state is a yellow light, a portion corresponding to the yellow light in the figure may be drawn in yellow, and portions corresponding to the green light and the red light may be drawn, for example, in white or may not be drawn at all. In response to the signal state changing to a red light, a portion corresponding to the red light in the figure may be drawn in red, and portions corresponding to the green light and the yellow light may be drawn, for example, in white or may not be drawn at all.

(Variation 1-3)

FIGS. 5A to 5E illustrate some patterns PTN_B according to a variation.

Figure 5A:
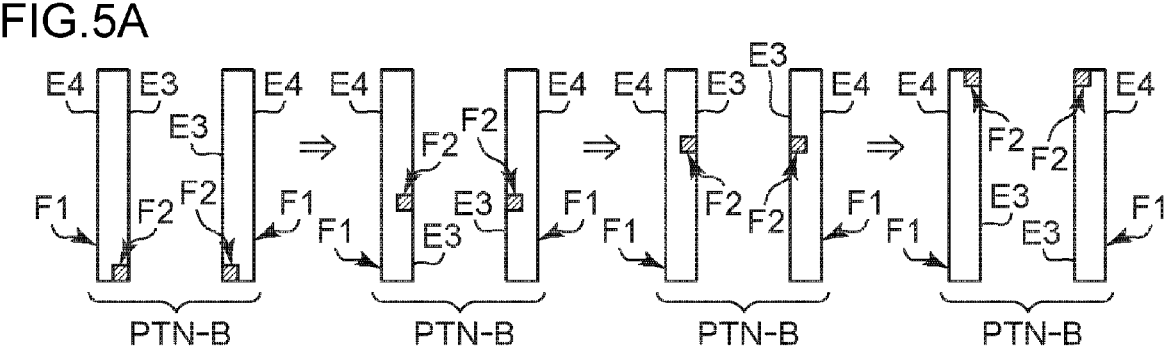
FIGS. 5A to 5E illustrate some patterns according to a variation.
Figure 5B:
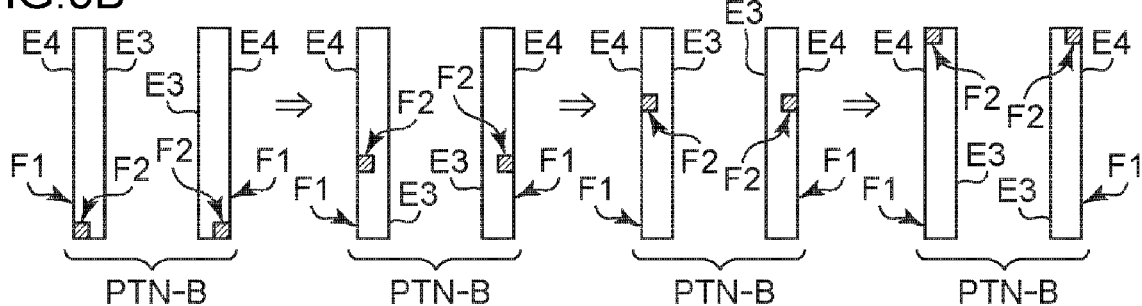

In FIGS. 5A and 5B, figures F2 slide and move like those according to Embodiment 1. In FIG. 5A, the figures F2 touch inner edges E3 of respective figures F1 but do not touch outer edges E4. In other words, the figures F2 are located toward the inner edges E3 inside the figures F1. In FIG. 5A, the inner edge E3 of the figures F1 may show the width of the vehicle. In FIG. 5B, the figures F2 touch outer edges E4 of respective figures F1 but do not touch inner edges E3. In other words, the figures F2 are located toward the outer edges E4 inside the figures F1. In FIG. 5B, the outer edges E4 of the figures F1 may show the width of the vehicle.

Figure 5C:
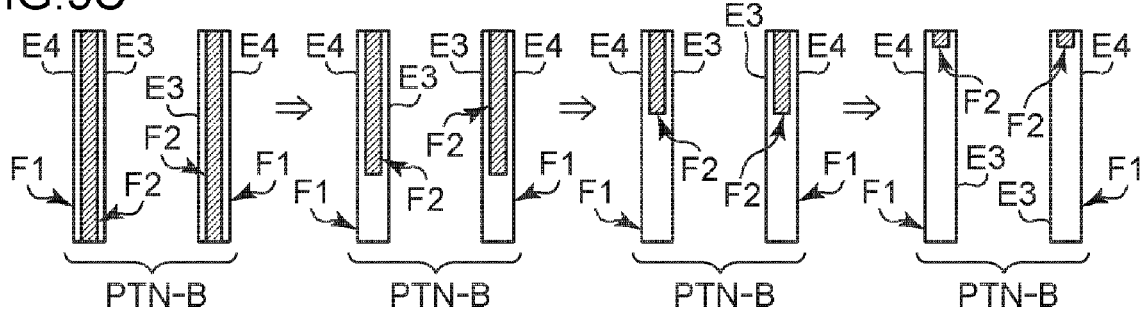
Figure 5D:
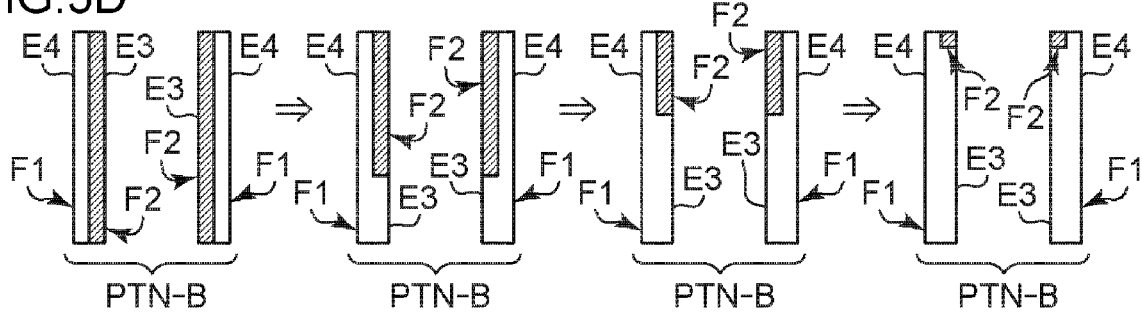
Figure 5E:
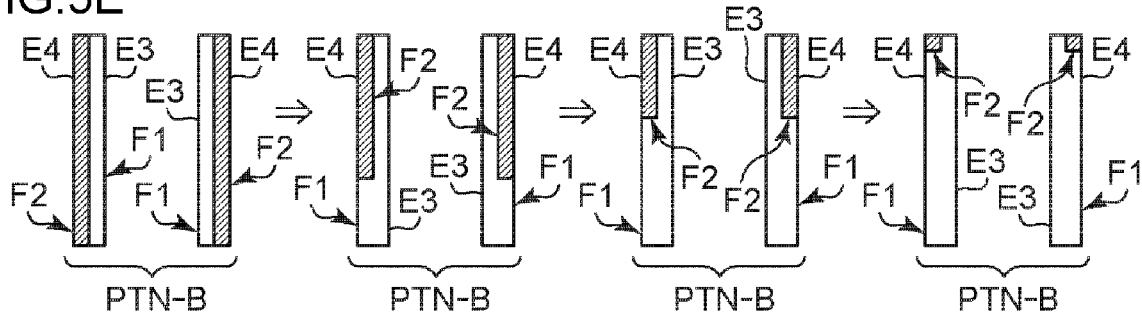

In FIGS. 5C to 5E, the length of each figure F2 is reduced over time from its full length that is the same as the length of each figure F1. The speed at which each figure F2 is shortened changes in accordance with (e.g., in proportion to) the vehicle speed. Once the length of the figures F2 becomes zero, that is, once the figures F2 disappear from the figures F1, new figures F2 appear, and the length of these figures F2 is again reduced over time from their full length that is the same as the length of the figures F1.

In FIG. 5C, each figure F2 is located in the middle of the corresponding figure F1 in the right-left direction. In FIG. 5D, each figure F2 is located toward the inner edge E3 inside the corresponding figure F1 such that the figure F2 touches the inner edge E3 of the figure F1. In FIG. 5D, the inner edges E3 of the figures F1 may show the width of the vehicle. In FIG. 5E, each figure F2 is located toward the outer edge E4 inside the corresponding figure F1 such that the figure F2 touches the outer edge E4 of the figure F1. In FIG. 5E, the outer edges E4 of the figures F1 may show the width of the vehicle.

(Variation 1-4)

The light distribution variable lamp 110 according to Embodiment 1 is a light source additional to the low beam and the high beam. Alternatively, the function of at least one of the low beam or the high beam may be integrated into the light distribution variable lamp 110.

II Second Aspect of the Present Disclosure

Now, a second aspect of the present disclosure will be described based on an exemplary embodiment and with reference to drawings.

Figure 6:
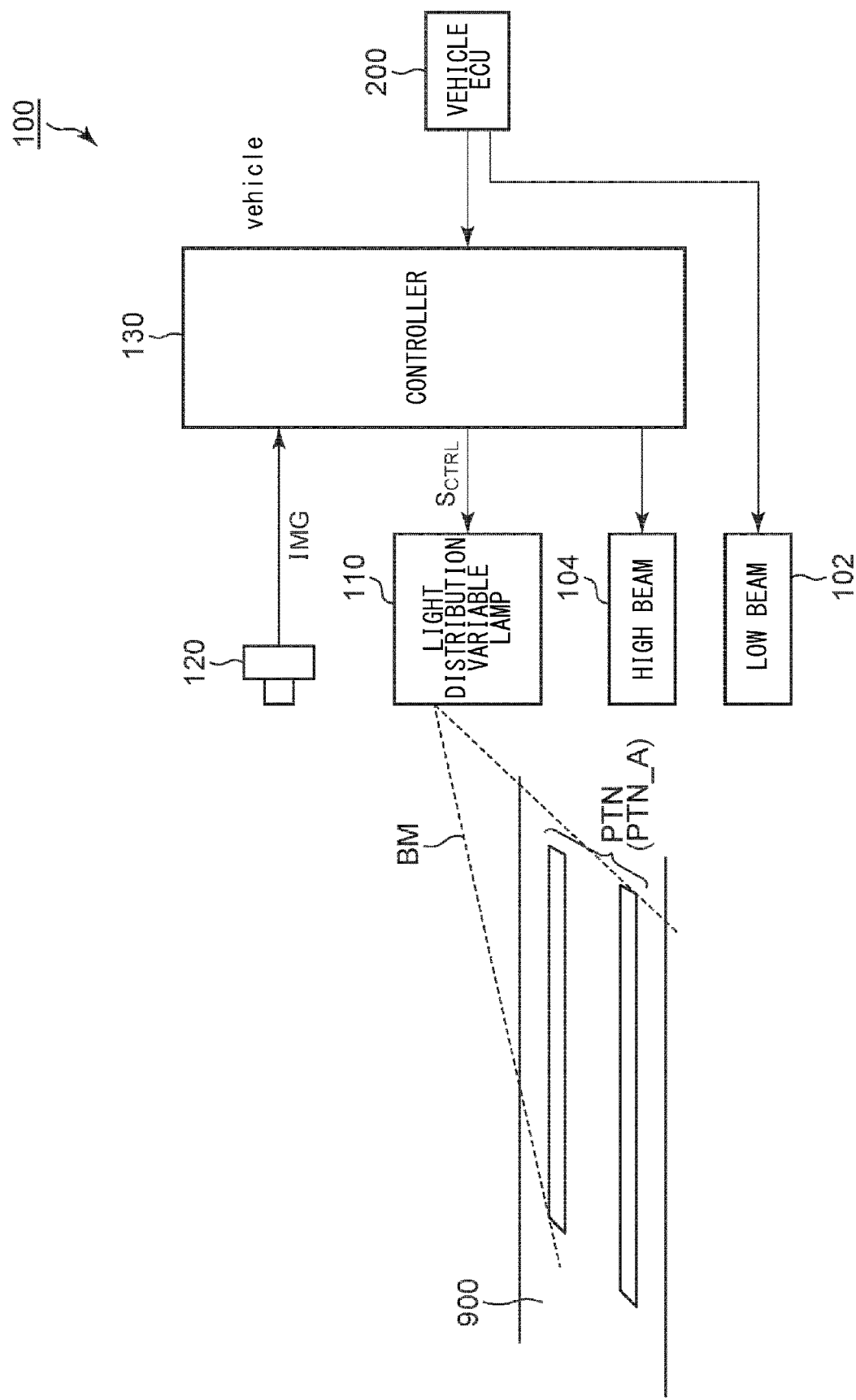
FIG. 6 is a block diagram of a lamp system according to Embodiment 2.

FIG. 6 is a block diagram of a lamp system 100 according to Embodiment 2. The lamp system 100 includes a light distribution variable lamp (road surface drawing lamp) 110, a camera 120, a controller 130, a low beam 102, and a high beam 104. These components may all be housed within a single housing, or some of these components may be provided outside a housing, that is, provided in a vehicle.

According to the present embodiment, the light distribution variable lamp 110 is provided additionally to and separately from the low beam 102 and the high beam 104. Hence, the light distribution variable lamp 110 may also be referred to as an additional beam.

The light distribution variable lamp 110 receives, from the controller 130, a control signal $S_{CTRL}$ instructing a pattern PTN to be drawn on a road surface 900. Then, the light distribution variable lamp 110 illuminates the road surface 900 ahead of the vehicle with a beam BM having an intensity distribution 902 corresponding to the control signal $S_{CTRL}$ and draws the pattern PTN on the road surface 900.

There is no particular limitation on the configuration of the light distribution variable lamp 110, and the light distribution variable lamp 110 may include, for example, a semiconductor light source, such as an LD or an LED, and a lighting circuit that drives the semiconductor light source to turn it on. To form an illuminance distribution corresponding to a pattern PTN, the light distribution variable lamp 110 may include a pattern forming device of a matrix type, such as a DMD or a liquid-crystal device. Alternatively, the light distribution variable lamp 110 may be an array of light-emitting elements (also called μ-LED).

An illumination area that the light distribution variable lamp 110 illuminates is set to cover at least the road surface 900. The illumination area that the light distribution variable lamp 110 illuminates may overlap a part of an illumination area of the low beam 102. Hence, the light distribution variable lamp 110 may form a pattern PTN with an illuminance higher than that of the low beam.

The camera 120 captures an image ahead of the vehicle. The controller 130 may control a pattern PTN that the light distribution variable lamp 110 is to draw on the road surface 900, based on an image captured by the camera 120 (hereinafter, referred to as a camera image IMG).

Like the light distribution variable lamp 110, the high beam 104 may also be capable of varying its light distribution. In this case, the controller 130 may control the light distribution of the high beam 104 based on a camera image IMG.

A command to, for example, turn on or off the light distribution variable lamp 110, the low beam 102, or the high beam 104 is transmitted from a vehicle ECU 200 to the lamp system 100. Moreover, information necessary for light distribution control is transmitted from the vehicle ECU 200 to the lamp system 100.

The controller 130 can be formed by a digital processor. The controller 130 may be formed, for example but not limited to, by a combination of a microcomputer including a CPU and a software program or by an FPGA or an ASIC.

The controller 130 controls the light distribution variable lamp 110 and draws a pattern PTN for drive assistance on the road surface 900 with a beam BM. For example, the controller 130 draws, as a pattern PTN characteristic to the lamp system 100 according to Embodiment 2, a pattern PTN_A indicating the width of the vehicle provided with the lamp system 100 (such a vehicle is also referred to below as a host vehicle). The pattern PTN_A may, for example, include a figure and indicate a future course of a predetermined portion of the vehicle by an edge of the figure.

There is no particular limitation on such a predetermined portion, and the predetermined portion is a predetermined portion of a tire, a predetermined portion of the vehicle body, or a predetermined portion of a mirror. The predetermined portion of a tire may be the outermost end portion of the tire in the widthwise direction of the vehicle, a center portion of the tire in the widthwise direction of the vehicle, or the innermost end portion of the tire in the widthwise direction of the vehicle. The predetermined portion of the vehicle body may be one of the outermost ends of the vehicle body in the widthwise direction of the vehicle. The predetermined portion of a mirror may be the outermost end portion of the mirror in the widthwise direction of the vehicle.

The controller 130 starts drawing a pattern PTN_A on the road surface 900 at the start of a predetermined event and turns off the pattern PTN_A at the end of the event. There is no particular limitation on the predetermined event, and the predetermined event is, for example, approaching to a pedestrian or an obstacle (referred to below as an approaching event), traveling on a narrow road (referred to below as a narrow width event), or passing of an oncoming vehicle (referred to below as a passing event).

The controller 130 may determine the start and the end of an approaching event based, for example, on a camera image IMG. Specifically, for example, the controller 130 may determine that an approaching event has started when the distance between the host vehicle and a pedestrian or the like identified in a camera image IMG has reached or fallen below a predetermined value and determine that the approaching event has ended when the distance between the host vehicle and the pedestrian or the like has exceeded the predetermined value or when the host vehicle has passed the pedestrian or the like.

The controller 130 may determine the start and the end of a narrow width event based, for example, on information from a car navigation system or on a camera image IMG. The controller 130 may determine that a narrow width event has started or ended based on the driver having operated a switch (not illustrated) to input the start or the end.

The controller 130 may determine the start and the end of a passing event based, for example, on a camera image IMG. Specifically, for example, the controller 130 may, based on a camera image IMG, determine that a passing event has started when the distance to an oncoming vehicle has reached or fallen below a predetermined value while the host vehicle is on a road with no center line or determine that the passing event has ended when the host vehicle has passed the oncoming vehicle.

The controller 130 may start drawing a pattern PTN_A on the road surface 900 in response to the driver having operated the switch (not illustrated) to input the start and may turn off the pattern PTN_A in response to the driver having operated the switch to input the end.

The above describes a basic configuration of the lamp system 100. Now, an operation of the lamp system 100 will be described.

FIGS. 7A to 7C each illustrate an example of a pattern PTN_A. The patterns PTN_A illustrated in FIGS. 7A to 7C each include one FIG. 10 that extends in the traveling direction of the vehicle 906. That is, the lengthwise direction of the FIG. 10 matches the traveling direction. In the pattern PTN_A illustrated in FIG. 7A, edges 10L and 10R on the left and right ends of the FIG. 10 in the widthwise direction of the vehicle show a future course of predetermined portions (the outermost ends in the widthwise direction of the vehicle in this example) of left and right tires 908L and 908R of the vehicle 906. In the pattern PTN_A illustrated in FIG. 7B, edges 10L and 10R on the left and right ends of the FIG. 10 in the widthwise direction of the vehicle show a future course of predetermined portions (the outermost ends in the widthwise direction of the vehicle in this example) of a vehicle body 907 of the vehicle 906. In the pattern PTN_A illustrated in FIG. 7C, edges 10L and 10R on the left and right ends of the FIG. 10 in the widthwise direction of the vehicle show a future course of predetermined portions (the outermost ends in the widthwise direction of the vehicle in this example) of left and right mirrors 909L and 909R of the vehicle 906. In one sense, in each of the patterns PTN_A illustrated in FIGS. 7A to 7C, the FIG. 10 shows the distance between the predetermined portions of the left and right tires 908L and 908R, the distance between the predetermined portions of the vehicle body 907, or the distance between the predetermined portions of the left and right mirrors 909L and 909R.

Drawing any of the patterns PTN_A illustrated in FIGS. 7A to 7C enables the driver to grasp a future course of predetermined portions of the vehicle 906 or the width of the vehicle 906, and this can reduce the likelihood of the vehicle running off the course, coming into contact with an obstacle such as a wall, or making contact with another vehicle or a pedestrian. Moreover, drawing any of the patterns PTN_A illustrated in FIGS. 7A to 7C can inform a pedestrian or another vehicle of an approach of the vehicle 906 and can prompt the pedestrian or the other vehicle to take evasive action.

FIGS. 8A to 8C each illustrate another example of a pattern PTN_A. The patterns PTN_A illustrated in FIGS. 8A to 8C each include two figures 12L and 12R that extend in the traveling direction of the vehicle 906. In the pattern PTN_A illustrated in FIG. 8A, inner edges $12L_I$ and $12R_I$ of the two figures 12L and 12R show a future course of predetermined portions (the outermost ends in the widthwise direction of the vehicle in this example) of the left and right tires 908L and 908R of the vehicle 906. In the pattern PTN_A illustrated in FIG. 8B, inner edges $12L_I$ and $12R_I$ of the two figures 12L and 12R show a future course of predetermined portions (the outermost ends in the widthwise direction of the vehicle in this example) of the vehicle body 907 of the vehicle 906. In the pattern PTN_A illustrated in FIG. 8C, inner edges $12L_I$ and $12R_I$ of the two figures 12L and 12R show a future course of predetermined portions (the outermost ends in the widthwise direction of the vehicle in this example) of the left and right mirrors 909L and 909R of the vehicle 906. In one sense, in each of the patterns PTN_A illustrated in FIGS. 8A to 8C, the inner edges $12L_I$ and $12R_I$ of the two figures 12L and 12R show the distance between the predetermined portions of the left and right tires 908L and 908R, the distance between the predetermined portions of the vehicle body 907, or the distance between the predetermined portions of the left and right mirrors 909L and 909R.

Drawing the patterns PTN_A illustrated in FIGS. 8A to 8C can provide advantageous effects similar to those provided when the patterns PTN_A illustrated in FIGS. 7A to 7C are drawn.

Moreover, although it depends on the width of each figure 12L or 12R, drawing the patterns PTN_A illustrated in FIGS. 8A to 8C can make the outward regions in the widthwise direction of the vehicle brighter by the figures 12L and 12R, and this makes it possible to more accurately grasp the situations in the outward regions in the widthwise direction of the vehicle.

In the patterns PTN_A illustrated in FIGS. 8A to 8C, if outer edges $12L_O$ and $12R_O$, in addition to the inner edges $12L_I$ and $12R_I$, of the two figures 12L and 12R are clearly visible, this could cause annoyance, and thus the two figures 12L and 12R may be made less bright toward the outer sides in the widthwise direction of the vehicle, that is, toward the outer edges $12L_O$ and $12R_O$.

The width of the vehicle 906 is shown by the inner edges $12L_I$ and $12R_I$ of the two figures 12L and 12R in the patterns PTN_A illustrated in FIGS. 8A to 8C. In one variation, the width of the vehicle 906 may be shown by the outer edges $12L_O$ and $12R_O$.

FIGS. 9A and 9B each illustrate yet another example of a pattern PTN_A. The patterns PTN_A illustrated in FIGS. 9A and 9B each include two figures 12L and 12R that extend in the traveling direction of the vehicle 906. In the pattern PTN_A illustrated in FIG. 9A, inner edges $12L_I$ and $12R_I$ of the two figures 12L and 12R show a future course of predetermined portions (the outermost ends in the widthwise direction of the vehicle in this example) of the left and right tires 908L and 908R of the vehicle 906, and outer edges $12L_O$ and $12R_O$ of the two figures 12L and 12R show a future course of predetermined portions (the outermost ends in the widthwise direction of the vehicle in this example) of the vehicle body 907 of the vehicle 906. In one sense, in the pattern PTN_A illustrated in FIG. 9A, the inner edges $12L_I$ and $12R_I$ of the two figures 12L and 12R show the distance between the predetermined portions of the left and right tires 908L and 908R, and the outer edges $12L_O$ and $12R_O$ of the two figures 12L and 12R show the width of the vehicle body 907.

In the pattern PTN_A illustrated in FIG. 9B, inner edges $12L_I$ and $12R_I$ of the two figures 12L and 12R show a future course of predetermined portions (the outermost ends in the widthwise direction of the vehicle in this example) of the left and right tires 908L and 908R of the vehicle 906, and outer edges $12L_O$ and $12R_O$ of the two figures 12L and 12R show a future course of predetermined portions (the outermost ends in the widthwise direction of the vehicle in this example) of the left and right mirrors 909L and 909R of the vehicle 906. In one sense, in the pattern PTN_A illustrated in FIG. 9B, the inner edges $12L_I$ and $12R_I$ of the two figures 12L and 12R show the distance between the predetermined portions of the left and right tires 908L and 908R, and the outer edges $12L_O$ and $12R_O$ of the two figures 12L and 12R show the distance between the predetermined portions of the left and right mirrors 909L and 909R.

In the patterns PTN_A illustrated in FIGS. 9A and 9B, if the inner edges $12L_I$ and $12R_I$ as well as the outer edges $12L_O$ and $12R_O$ of the two figures 12L and 12R are clearly visible, this could cause annoyance, and thus the two figures 12L and 12R may be made less bright toward the outer sides in the widthwise direction of the vehicle, that is, toward the outer edges $12L_O$ and $12R_O$ or may be made less bright toward the inner sides in the widthwise direction of the vehicle, that is, toward the inner edges $12L_I$ and $12R_I$.

Figure 10A:
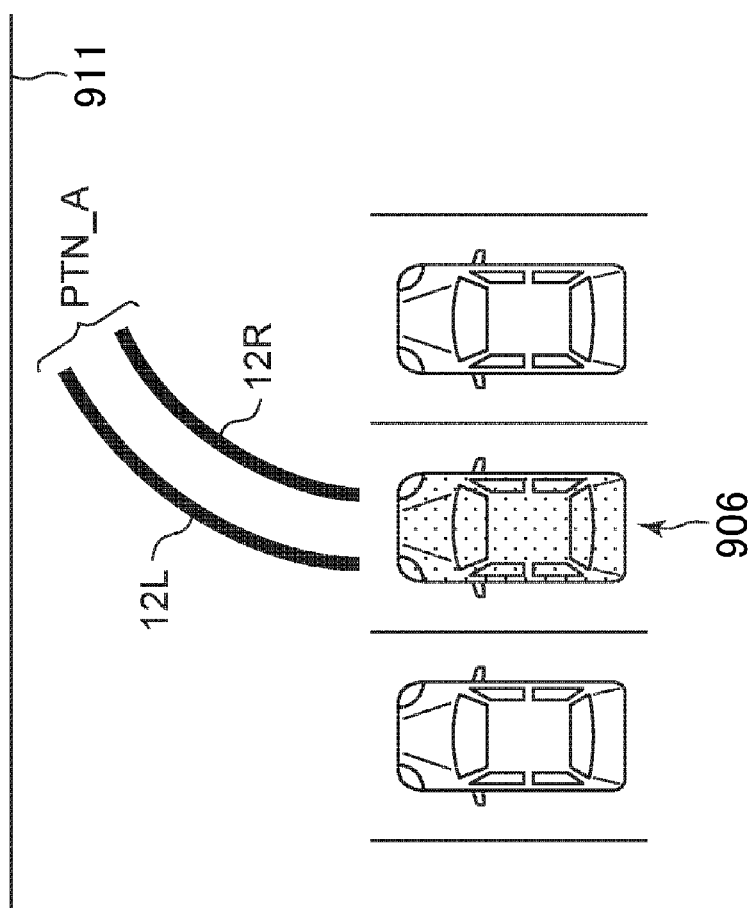
FIGS. 10A and 10B each illustrate a pattern that a light distribution variable lamp draws on a road surface when a vehicle is to make a turn.
Figure 10B:
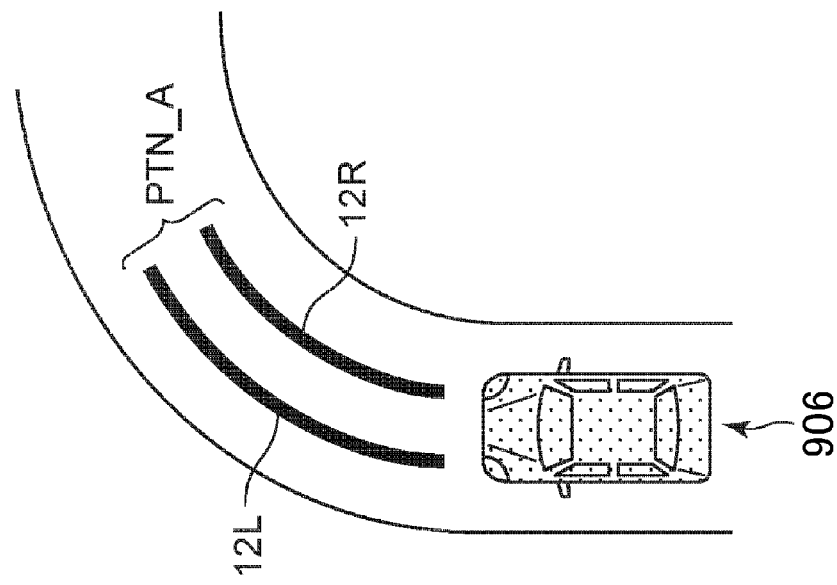

FIGS. 10A and 10B each illustrate a pattern PTN_A drawn when the vehicle 906 is to make a turn. In FIG. 10A, the vehicle 906 is approaching a curve. In FIG. 10B, there is an obstacle (wall) 911 directly facing the parking space.

The controller 130 draws a pattern PTN_A that includes two figures 12L and 12R curved in the direction into which the vehicle 906 is to turn, based on information from a car navigation system or the steering angle. In the patterns PTN_A illustrated in FIGS. 10A and 10B, inner edges $12L_I$ and $12R_I$ of the two figures 12L and 12R may show a future course of or the distance between predetermined portions of the vehicle, as in the examples illustrated in FIGS. 8A to 8C, or the set of inner edges $12L_I$ and $12R_I$ and the set of outer edges $12L_O$ and $12R_O$ of the two figures 12L and 12R may each show a future course of or the distance between predetermined portions of the vehicle, as in the examples illustrated in FIGS. 9A and 9B.

Drawing the patterns PTN_A illustrated in FIGS. 10A and 10B can provide advantageous effects similar to those provided when any of the patterns PTN_A illustrated in FIGS. 8A to 8C or in FIGS. 9A and 9B is drawn. Moreover, drawing the pattern PTN_A in the situation illustrated in FIG. 10B can inform the driver whether the driver needs to turn the wheel in both directions to turn the vehicle 906 without making contact with the obstacle 911.

The patterns PTN_A illustrated in FIGS. 8A to 8C, the patterns PTN_A illustrated in FIGS. 9A and 9B, and the patterns PTN_A illustrated in FIGS. 10A and 10B each include two figures 12L and 12R. Alternatively, these patterns PTN_A may each include only one of the figure 12L or 12R. For example, a pattern PTN_A may include only one of the figure 12L or 12R that is closer to the sidewalk and may not include the figure closer to the oncoming lane. In another example, in a case where there is a wall only on one of the right or left side, a pattern PTN_A may include only one of the figures that is closer to the wall.

(Variation 2-1)

Figure 11B:
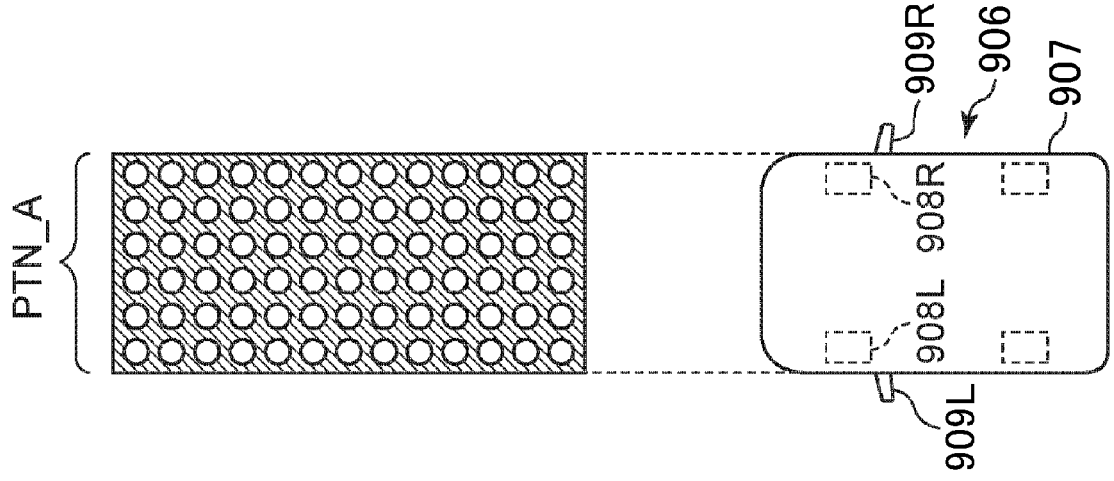
FIGS. 11A and 11B illustrate some variations of a pattern that a light distribution variable lamp draws on a road surface.
Figure 11A:
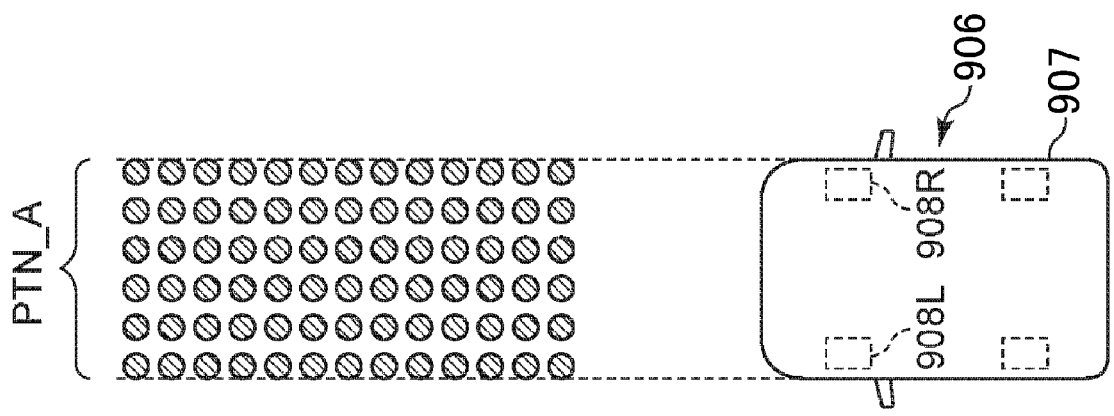

FIGS. 11A and 11B illustrate some patterns PTN_A according to a variation. The patterns PTN_A illustrated in FIGS. 11A and 11B each include a set of dots spreading in the traveling direction of the vehicle 906. Each dot may have a circular shape or a substantially circular shape, such as an elliptical shape. The dots in FIG. 11A are drawn by light, and the dots in FIG. 11B are drawn by shadow. In FIG. 11A, the edges of the set of dots show the width of the vehicle 906 or a future course of predetermined portions (the outermost ends of the vehicle body 907 in the widthwise direction of the vehicle in this example) of the vehicle 906. Herein, the drawings in FIGS. 11A and 11B may be, for example, switched periodically to be animated.

(Variation 2-2)

Figure 12A:
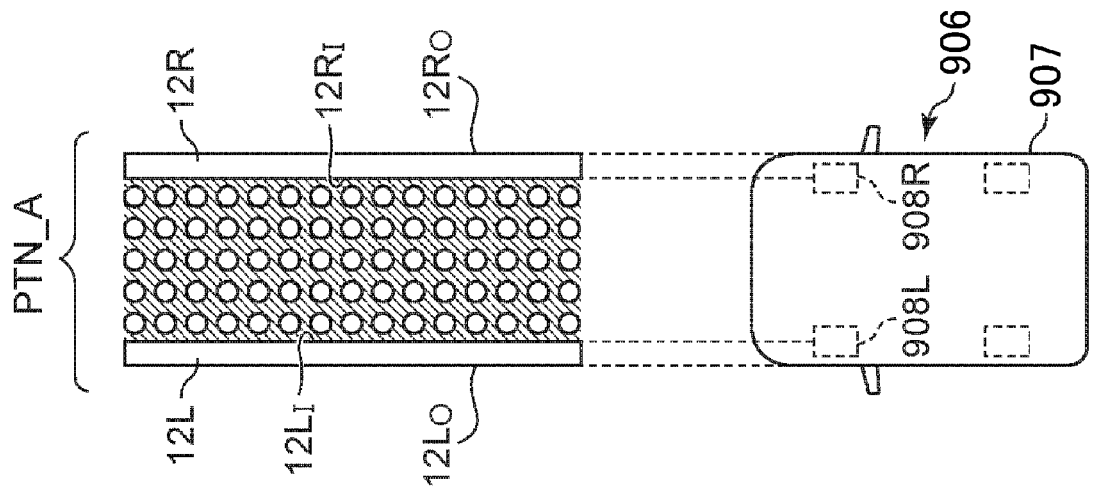
FIGS. 12A and 12B illustrate some other variations of a pattern that a light distribution variable lamp draws on a road surface.
Figure 12B:
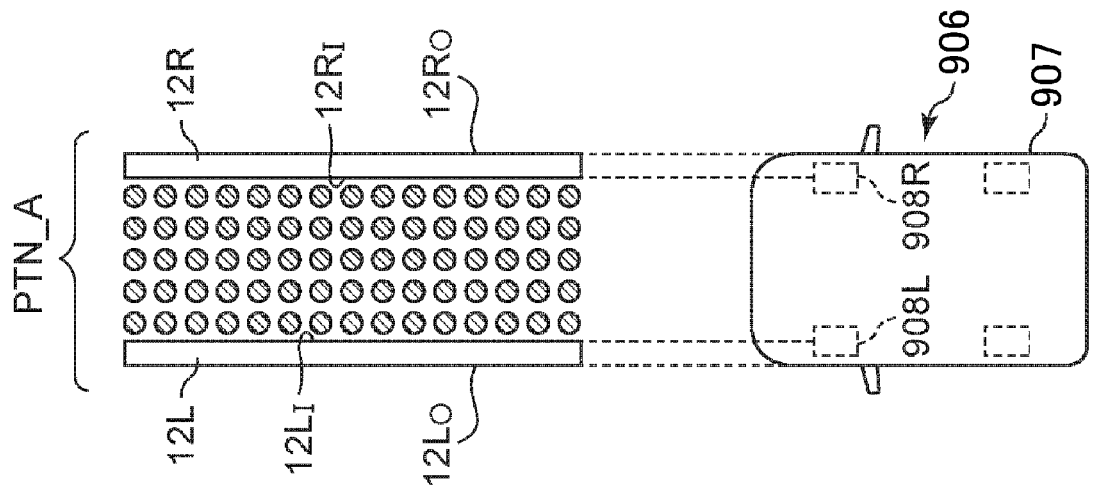

FIGS. 12A and 12B illustrate some patterns PTN_A according to another variation. The patterns PTN_A illustrated in FIGS. 12A and 12B each include two figures 12L and 12R that extend in the traveling direction of the vehicle 906. The patterns PTN_A each further include a plurality of dots arranged between the two figures 12L and 12R. Each dot may have a circular shape or a substantially circular shape, such as an elliptical shape. The dots in FIG. 12A are drawn by light, and the dots in FIG. 12B are drawn by shadow. Herein, the drawings in FIGS. 12A and 12B may be, for example, switched periodically to be animated.

(Variation 2-3)

The vehicle provided with the lamp system 100 may be a vehicle capable of automatic driving. A pattern PTN_A may be drawn similarly during automatic driving and during manual driving. Drawing a pattern PTN_A can inform a pedestrian or another vehicle that the host vehicle is approaching, and this can prompt the pedestrian or the other vehicle to take evasive action of moving outside the width of the host vehicle. Moreover, drawing a pattern PTN_A can let a pedestrian know that the host vehicle in automatic driving is looking out to its surroundings, and this can make the pedestrian feel safe.

(Variation 2-4)

The controller 130 according to Embodiment 2 determines an approach of a pedestrian or an obstacle based on a camera image IMG captured by the camera 120. Alternatively, the lamp system 100 may include a stereo camera, a ToF camera, LiDAR, or an infrared sensor, and based on their detection result, the controller 130 may determine an approach of a pedestrian or an obstacle.

(Variation 2-5)

According to Embodiment 2, the light distribution variable lamp 110 is a light source additional to the low beam 102 and the high beam 104. Alternatively, the function of at least one of the low beam 102 or the high beam 104 may be integrated into the light distribution variable lamp 110.

III Third Aspect of the Present Disclosure

Now, a third aspect of the present disclosure will be described based on some exemplary embodiments and with reference to drawings.

Embodiment 3-1

Figure 13:
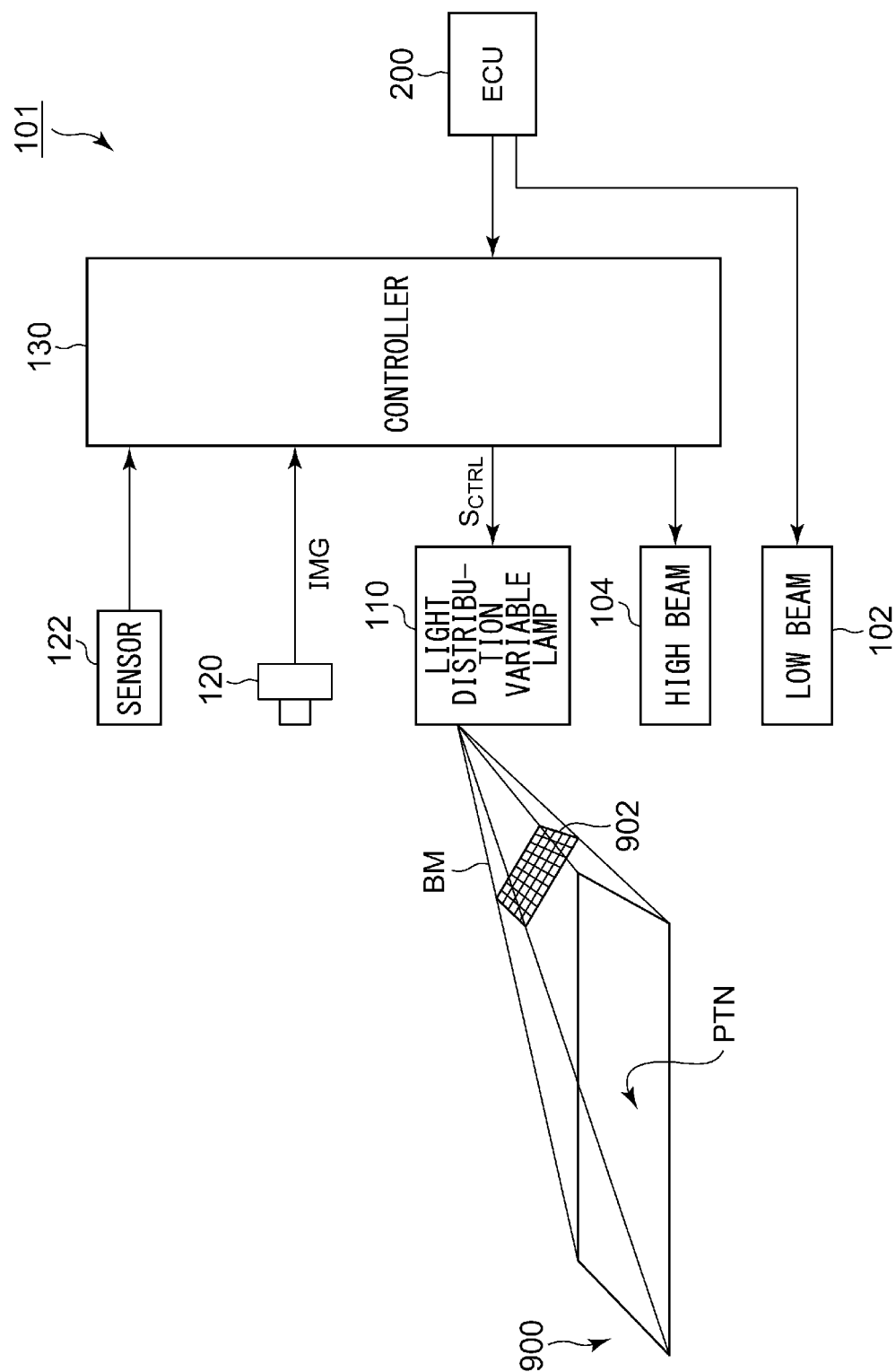
FIG. 13 is a block diagram of a vehicle display system according to Embodiment 3-1.

FIG. 13 is a block diagram of a vehicle display system (road surface drawing system) 101 according to Embodiment 3-1. The vehicle display system 101 includes a light distribution variable lamp (road surface drawing lamp) 110, a camera 120, a sensor 122, a controller 130, a low beam 102, and a high beam 104. These components may all be housed within a single housing, or some of these components may be provided outside a housing, that is, provided in a vehicle.

According to the present embodiment, the light distribution variable lamp 110 is provided additionally to and separately from the low beam 102 and the high beam 104. Hence, the light distribution variable lamp 110 may also be referred to as an additional beam.

The light distribution variable lamp 110 receives, from the controller 130, a control signal $S_{CTRL}$ instructing a pattern PTN to be drawn on a road surface 900. Then, the light distribution variable lamp 110 illuminates the road surface 900 ahead of the vehicle with a beam BM having an intensity distribution 902 corresponding to the control signal $S_{CTRL}$ and draws the pattern PTN on the road surface 900.

There is no particular limitation on the configuration of the light distribution variable lamp 110, and the light distribution variable lamp 110 may include, for example, a semiconductor light source, such as an LD or an LED, and a lighting circuit that drives the semiconductor light source to turn it on. To form an illuminance distribution corresponding to a pattern PTN, the light distribution variable lamp 110 may include a pattern forming device of a matrix type, such as a DMD or a liquid-crystal device. Alternatively, the light distribution variable lamp 110 may be an array of light-emitting elements (also called p-LED).

An illumination area that the light distribution variable lamp 110 illuminates is set to cover at least the road surface 900. The illumination area that the light distribution variable lamp 110 illuminates may overlap a part of an illumination area of the low beam 102. Hence, the light distribution variable lamp 110 may form a pattern PTN with an illuminance higher than that of the low beam.

The camera 120 captures an image ahead of the vehicle. The controller 130 may control a pattern PTN that the light distribution variable lamp 110 is to draw on the road surface 900, based on an image captured by the camera 120 (hereinafter, referred to as a camera image IMG).

The sensor 122 is provided to detect an approach of a person satisfying a predetermined condition. Therefore, the sensor 122 may be designed or selected in accordance with the predetermined condition. In a case where the predetermined condition is, for example, an approach of a person holding the key to the vehicle or a smartphone registered for the vehicle, a device that can communicate with the key or the smartphone or that can receive a wireless signal emitted by the key or the smartphone may be selected as the sensor 122.

Like the light distribution variable lamp 110, the high beam 104 may also be capable of varying its light distribution. In this case, the controller 130 may control the light distribution of the high beam 104 based on a camera image IMG.

The controller 130 controls the light distribution variable lamp 110. The controller 130 can be formed by a digital processor. The controller 130 may be formed, for example but not limited to, by a combination of a microcomputer including a CPU and a software program or by an FPGA or an ASIC.

The controller 130 controls the light distribution variable lamp 110 and draws a pattern PTN for drive assistance on the road surface 900 with a beam BM. There is no particular limitation on a pattern PTN to be drawn, and, for example, a legal speed limit, a road sign, or the like may be drawn for the driver's easy recognition. Alternatively, the traveling direction of the host vehicle may be drawn to assist drivers of other vehicles. In any case, a pattern PTN does not merely provide illumination like the low beam but includes information to be presented to the driver or other participants in the traffic.

An ECU 200 controls the vehicle display system 101 as a whole. For example, the ECU 200 generates a command to, for example, turn on or off the light distribution variable lamp 110. Moreover, the ECU 200 transmits information necessary for light distribution control to the controller 130.

Figure 14:
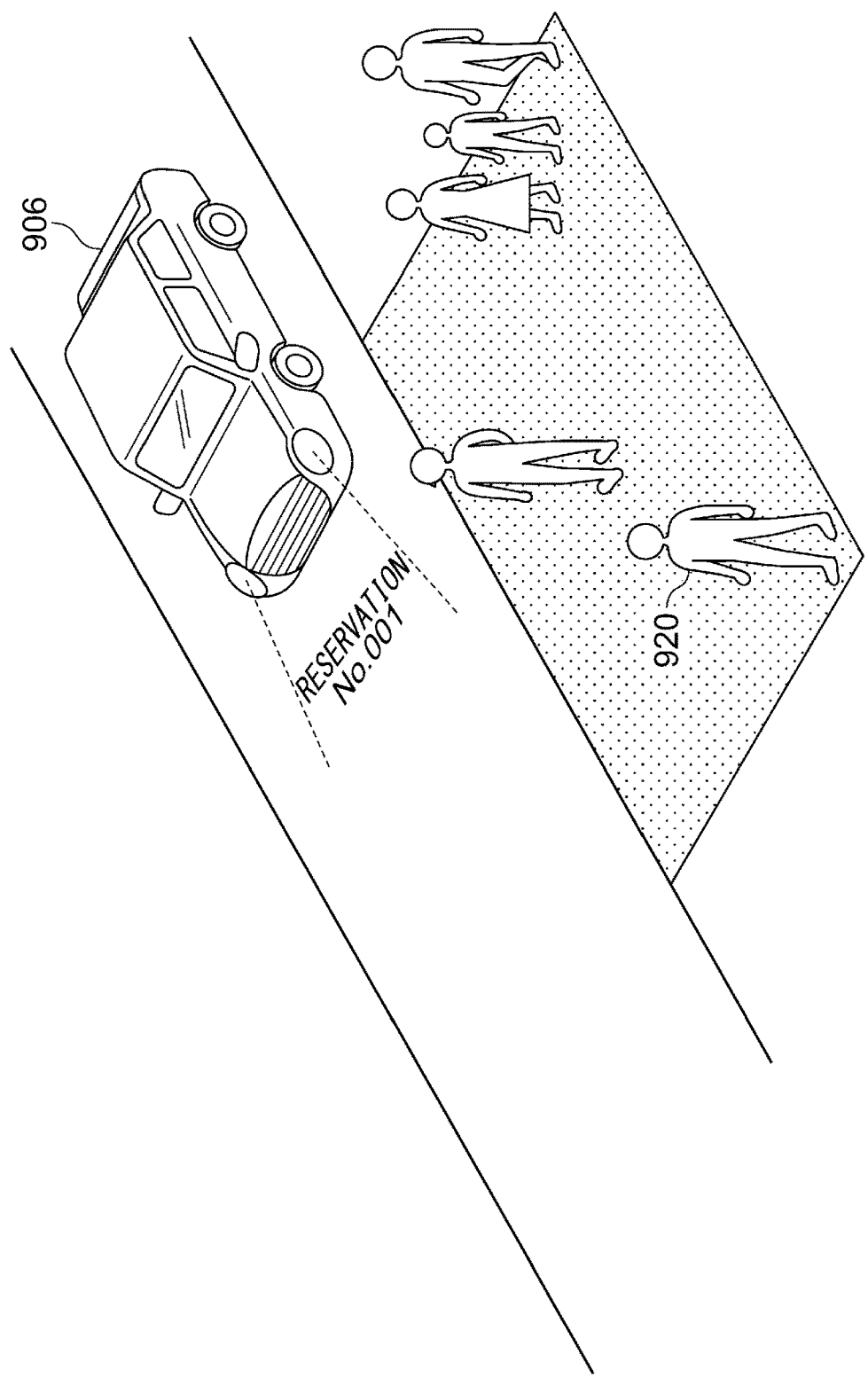
FIG. 14 is an illustration for describing a pattern characteristic to the vehicle display system illustrated in FIG. 1.

FIG. 14 is an illustration for describing a pattern (PTN_A) characteristic to the vehicle display system 101 according to the present embodiment. The controller 130 draws a pattern PTN_A informing a predetermined person 920 that the vehicle 906 has arrived, upon the vehicle 906 provided with the vehicle display system 101 arriving at a location designated in advance where the predetermined person 920 is supposed to be waiting (including a case where the vehicle 906 has reached within 10 meters of the designated location).

For example, the vehicle 906 may be a vehicle parked in a parking lot providing an automated valet parking service, and the person 920 may be the owner of the vehicle 906. In this case, the controller 130 draws a pattern PTN_A upon the vehicle 906 arriving in automatic driving at a location designated in advance by the person 920.

In another example, the vehicle 906 may be an automatic driving vehicle of car-sharing, and the person 920 may be its user. In this case, the controller 130 draws a pattern PTN_A upon the vehicle 906 arriving in automatic driving at a location that the person 920 has designated when making the reservation.

In yet another example, the vehicle 906 may be an automatic driving or manual driving taxi or a vehicle of ride-share, and the person 920 may be the user. In this case, the controller 130 may draw a pattern PTN_A upon the vehicle 906 arriving at a location that the person 920 has designated when making a dispatch request or the like.

A pattern PTN_A may include at least one of information pertaining to the person 920 waiting for the arrival of the vehicle 906 or information pertaining to the vehicle 906. In this case, the person 920 can find that the vehicle 906 that he or she has been waiting for has arrived by looking at the pattern PTN_A.

In a case where the person 920 is the owner of the vehicle 906, the person 920 can easily tell whether the vehicle 906 that has arrived is his or her vehicle, but if the designated location (riding location) is too congested for the person 920 to be able to see the vehicle 906, the person 920 may fail to recognize that the vehicle 906 has arrived. Even in this case, when the person 920 can see the pattern PTN_A, the person 920 can recognize that his or her vehicle has arrived upon looking at the information included in the pattern PTN_A. Meanwhile, in a case where the person 920 is a user of car-sharing, a taxi, or the like, if the person 920 designates his or her home as a designated location, the vehicle 906 that arrives is highly likely the vehicle that the person 920 has been waiting for. However, if the person 920 has designated a location where many vehicles stop, such as a hotel or an airport, as a designated location, the person 920 cannot tell whether the vehicle 906 that has arrived is the vehicle that the person 920 has been waiting for. Yet, by looking at the information included in the pattern PTN_A, the person 920 can recognize that the vehicle 906 that has arrived is the vehicle to be used by the person 920 and not by someone else in the surroundings.

Information pertaining to the person may be, for example, a name or a nickname of the person or a facial image of the person. In the case of car-sharing, a taxi, or the like, this information may be the user ID or a reservation number. In a case where the person 920 is the owner of the vehicle 906, the controller 130 may have information pertaining to the person pre-registered therein. In a case where the person 920 is the user of car-sharing, a taxi, or the like, information pertaining to the person may be pre-registered with the car-sharing service, the taxi service, or the like, and the controller 130 may receive this information in advance.

Information pertaining to the vehicle may be, for example, the vehicle registration number written on the license plate. In the case of car-sharing, a taxi, or the like, information pertaining to the vehicle may be provided to the person 920 in advance via, for example, a mobile device, such as a smartphone.

Alternatively, a pattern PTN_A may include one or more figures extending toward the person 920 or a plurality of figures so arranged as to spread toward the person 920. In this case, the person 920 can find that the vehicle that he or she has been waiting for has arrived by looking at the pattern PTN_A extending toward the person 920. The controller 130 may identify the position of the person 920 based, for example, on a camera image IMG and a pre-registered facial image of the person 920.

The controller 130 turns off a pattern PTN_A in response to a predetermined action of the person 920 who has been waiting for the vehicle 906. If the pattern PTN_A remains being drawn for a long time, it becomes an eyesore or an annoyance to people in the surroundings. Therefore, the controller 130 turns off the pattern PTN_A in response to the person 920 taking an action that indicates or allows the controller 130 to assume that the person 920 has realized the arrival of the vehicle 906.

The predetermined action is unlocking of a vehicle door, opening of a door, closing or a door, the person 920 approaching the vehicle 906 to within a predetermined distance if the person 920 satisfies a predetermined condition (e.g., the person 920 holds the key to the vehicle 906 or a smartphone registered for the vehicle 906), or the person 920 performing a predetermined operation concerning the vehicle 906 by use of a mobile device, such as a smartphone (e.g., an operation to start using a car-sharing vehicle).

The above describes a basic configuration of the vehicle display system 101. Now, an operation of the vehicle display system 101 will be described.

FIGS. 15A to 15D are illustration for describing an example of how the vehicle display system 101 draws a pattern PTN_A. FIGS. 15A to 15D show an operation of the vehicle display system 101 in time series.

No pattern PTN is drawn in FIG. 15A.

In FIG. 15B, the distance to the designated location is no greater than a predetermined threshold L1 (e.g., 20 meters), and thus a pattern PTN_B indicating that the vehicle 906 will soon arrive at the designated location, that is, that the vehicle 906 is about to stop is drawn on the road surface 900 ahead of the vehicle. In the example illustrated in FIG. 15B, the pattern PTN_B includes the character string "Approaching." The pattern PTN_B may be displayed flashing.

In FIG. 15C, the distance to the designated location is no greater than a predetermined threshold L2 (e.g., 10 meters) (L2<L1), and thus a pattern PTN_A indicating that the vehicle 906 has arrived at the designated location is drawn on the road surface 900 ahead of the vehicle. The threshold L2 may be zero. In this case, the pattern PTN_A is drawn after the vehicle 906 has stopped at the designated location. In a case where the threshold L2 is not zero, the pattern PTN_A is displayed before the vehicle stops. In the example illustrated in FIG. 15C, the pattern PTN_A includes the reservation number for car-sharing as information pertaining to the person 920. The person 920 can find that the vehicle that he or she has been waiting for has arrived by looking at the pattern PTN_A.

In FIG. 15D, the pattern PTN_A has been turned off as the person 920 has taken a predetermined action (has opened a door in this example).

FIGS. 16A to 16D are illustration for describing another example of how the vehicle display system 101 draws a pattern PTN_A. FIGS. 16A to 16D show an operation of the vehicle display system 101 in time series. FIGS. 16A, 16B, and 16D are similar to FIGS. 15A, 15B, and 15D.

In FIG. 16C, the pattern PTN_A includes a plurality of dots arranged to spread toward the person 920. Since a pattern that spreads automatically toward the person 920 is drawn, this pattern can create a sense of warm welcome.

Embodiment 3-2

In the case described according to Embodiment 3-1, a predetermined person is informed by a drawing on the road surface that the vehicle that has arrived is the vehicle that he or she has been waiting for. In the case described according to Embodiment 3-2, a predetermined person is informed by showing on a display that the vehicle that has arrived is the vehicle that he or she has been waiting for. The following description centers on the differences from Embodiment 3-1.

Figure 17:
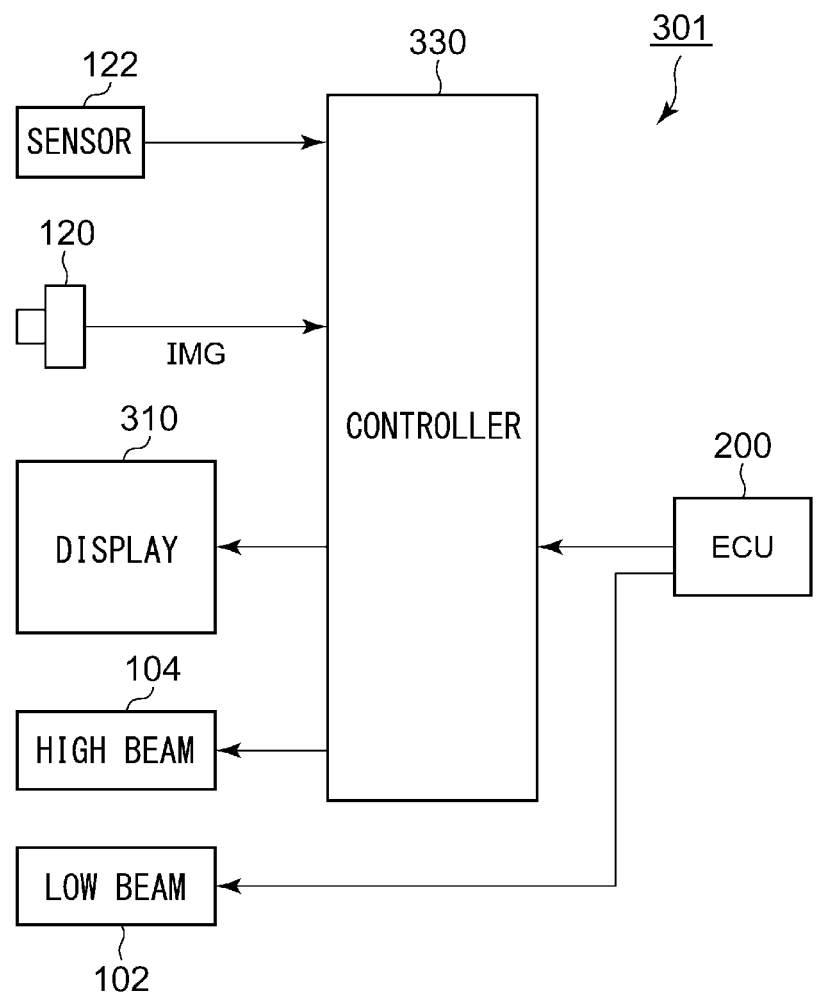
FIG. 17 is a block diagram of a vehicle display system according to Embodiment 3-2.

FIG. 17 is a block diagram of a vehicle display system 301 according to Embodiment 3-2. The vehicle display system 301 includes a display 310, a camera 120, a sensor 122, a controller 330, a low beam 102, and a high beam 104. The display 310 is provided on the outside of the vehicle body such that the display 310 is visible from the outside of the vehicle. The components other than the display 310 may all be housed within a single housing, or some of these components may be provided outside a housing, that is, provided in the vehicle.

There is no particular limitation on the configuration of the display 310, and the display 310 is preferably a thin display, such as an organic EL display or a liquid-crystal display.

The controller 330 may have a configuration similar to the configuration of the controller 130 according to Embodiment 3-1. The controller 330 controls the display 310 and causes predetermined information to be displayed on the display 310.

Figure 18:
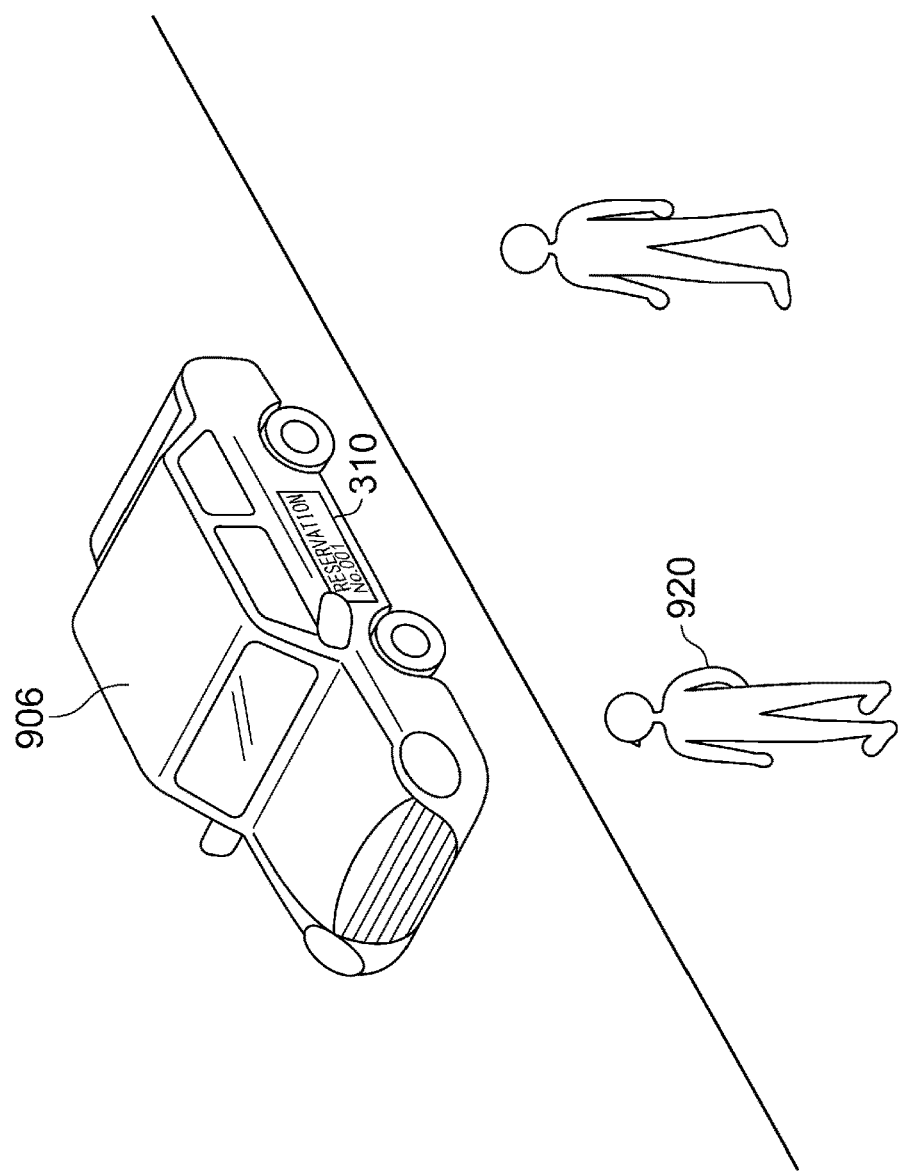
FIG. 18 is an illustration for describing an operation of the vehicle display system illustrated in FIG. 17.

FIG. 18 is an illustration for describing an operation of the vehicle display system 301. In this example, the display 310 is provided on a front door.

The controller 330 displays, on the display 310, information informing a predetermined person 920 that the vehicle 906 has arrived, upon the vehicle 906 provided with the vehicle display system 301 arriving at a location designated in advance where the predetermined person 920 is supposed to be waiting (including a case where the vehicle 906 has reached within 10 meters of the designated location). The information displayed on the display 310 may include at least one of information pertaining to the person 920 waiting for the arrival of the vehicle 906 or information pertaining to the vehicle 906. The person 920 can find that the vehicle 906 that he or she has been waiting for has arrived by looking at what is displayed on the display 310.

The controller 330 turns off what is displayed on the display 310 in response to a predetermined action of the person 920 who has been waiting for the vehicle 906. The predetermined action is similar to any of those described according to Embodiment 3-1. The above configuration can prevent people in the surroundings from feeling annoyed by the display that remains on for a long time.

Next, some variations related to Embodiment 3-1 will be described.

(Variation 3-1)

The light distribution variable lamp 110 according to Embodiment 3-1 is a light source additional to the low beam and the high beam. Alternatively, the function of at least one of the low beam or the high beam may be integrated into the light distribution variable lamp 110.

(Variation 3-2)

In the case described according to Embodiment 3-1, a pattern PTN_A includes at least one of information pertaining to the person 920 or information pertaining to the vehicle or includes a figure extending toward the person 920 or a plurality of figures arranged to spread toward the person 920. Meanwhile, in the case described according to Embodiment 3-2, information including at least one of information pertaining to the person 920 or information pertaining to the vehicle is shown on the display 310. These are not limiting examples, and information to be included in a pattern PTN_A or information to be shown on the display 310 may include information solely for informing that the vehicle 906 has arrived, such as "Welcome" or "Hello." This allows the person 920 to easily recognize that the vehicle 906 that has arrived is the vehicle that he or she is to use, when the designated location does not have many people around, such as in front of his or her home.

IV Fourth Aspect of the Present Disclosure

Now, a fourth aspect of the present disclosure will be described based on an exemplary embodiment and with reference to drawings.

Figure 19:
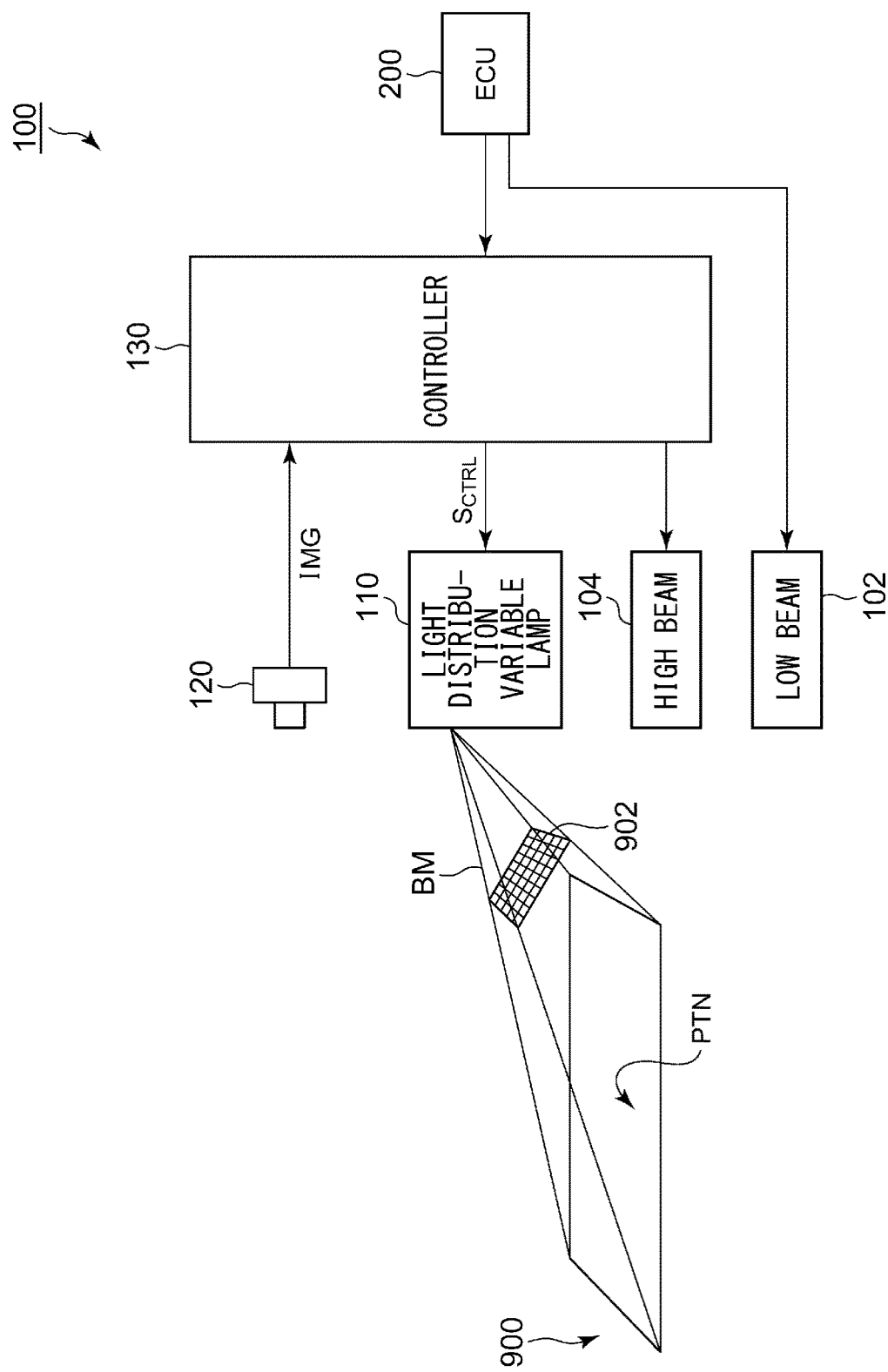
FIG. 19 is a block diagram of a vehicle display system according to Embodiment 4.

FIG. 19 is a block diagram of a lamp system 100 according to Embodiment 4. The lamp system 100 includes a light distribution variable lamp (road surface drawing lamp) 110, a camera 120, a controller 130, a low beam 102, and a high beam 104. These components may all be housed within a single housing, or some of these components may be provided outside a housing, that is, provided in the vehicle. The vehicle provided with the lamp system 100 may or may not be capable of automatic driving.

According to the present embodiment, the light distribution variable lamp 110 is provided additionally to and separately from the low beam 102 and the high beam 104. Hence, the light distribution variable lamp 110 may also be referred to as an additional beam.

The light distribution variable lamp 110 receives, from the controller 130, a control signal $S_{CTRL}$ instructing a pattern PTN to be drawn on a road surface 900. Then, the light distribution variable lamp 110 illuminates the road surface 900 ahead of the vehicle with a beam BM having an intensity distribution 902 corresponding to the control signal $S_{CTRL}$ and draws the pattern PTN on the road surface 900.

There is no particular limitation on the configuration of the light distribution variable lamp 110, and the light distribution variable lamp 110 may include, for example, a semiconductor light source, such as an LD or an LED, and a lighting circuit that drives the semiconductor light source to turn it on. To form an illuminance distribution corresponding to a pattern PTN, the light distribution variable lamp 110 may include a pattern forming device of a matrix type, such as a DMD or a liquid-crystal device. Alternatively, the light distribution variable lamp 110 may be an array of light-emitting elements (also called µ-LED).

An illumination area that the light distribution variable lamp 110 illuminates is set to cover at least the road surface 900. The illumination area that the light distribution variable lamp 110 illuminates may overlap a part of an illumination area of the low beam 102. Hence, the light distribution variable lamp 110 may form a pattern PTN with an illuminance higher than that of the low beam.

The camera 120 captures an image ahead of the vehicle. The controller 130 may control a pattern PTN that the light distribution variable lamp 110 is to draw on the road surface 900, based on an image captured by the camera 120 (hereinafter, referred to as a camera image IMG).

Like the light distribution variable lamp 110, the high beam 104 may also be capable of varying its light distribution. In this case, the controller 130 may control the light distribution of the high beam 104 based on a camera image IMG.

The controller 130 controls the light distribution variable lamp 110. The controller 130 can be formed by a digital processor. The controller 130 may be formed, for example but not limited to, by a combination of a microcomputer including a CPU and a software program or by an FPGA or an ASIC.

The controller 130 controls the light distribution variable lamp 110 and draws a pattern PTN for drive assistance on the road surface 900 with a beam BM. There is no particular limitation on a pattern PTN to be drawn, and, for example, a legal speed limit, a road sign, or the like may be drawn for the driver's easy recognition. Alternatively, the traveling direction of the host vehicle may be drawn to assist drivers of other vehicles. In any case, a pattern PTN does not merely provide illumination like the low beam but includes information to be presented to the driver or other participants in the traffic.

An ECU 200 controls the lamp system 100 as a whole. For example, the ECU 200 generates a command to, for example, turn on or off the light distribution variable lamp 110. Moreover, the ECU 200 transmits information necessary for light distribution control to the controller 130.

Figure 20:
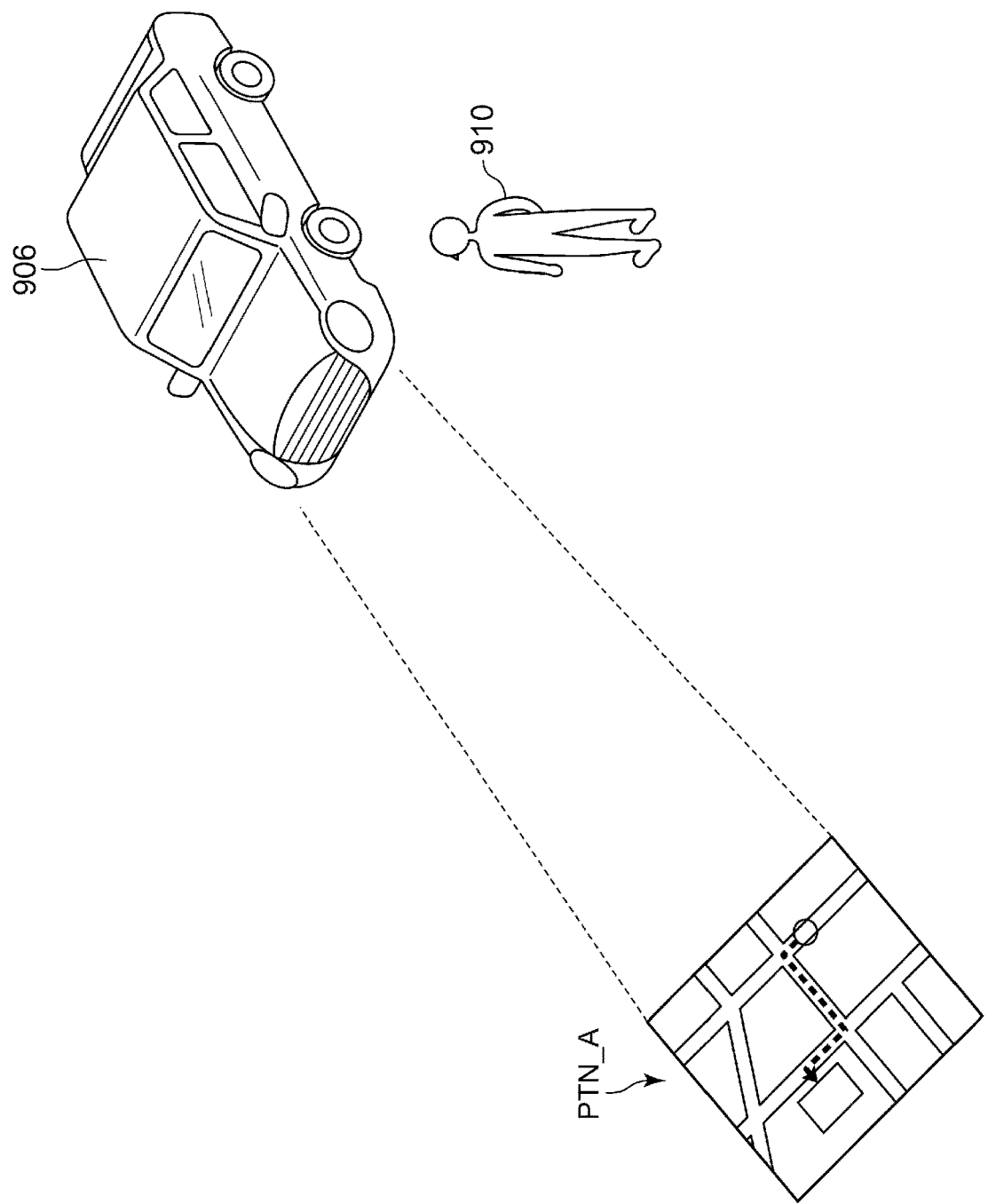
FIG. 20 is an illustration for describing a pattern characteristic to the lamp system illustrated in FIG. 19.

FIG. 20 is an illustration for describing a pattern (PTN_A) characteristic to the lamp system 100 according to the present embodiment. The controller 130 draws a pattern PTN_A on the road surface 900 upon receiving, via the internet or road-to-vehicle communication, information pertaining to a disaster provided by a predetermined service operated by a national or local government agency or a private corporation. The controller 130 may receive the information pertaining to a disaster directly or via the ECU 200. The information pertaining to a disaster is, for example but not limited to, a notification informing that a disaster has occurred, disaster information, or evacuation information. People can find out that a disaster has occurred by looking at the drawn pattern PTN_A.

In this example, the pattern PTN_A includes evacuation information (map information) including the current location, a shelter location, and an evacuation route from the current location to the shelter location. When a disaster, such as an earthquake, occurs, it is conceivable to evacuate to a safe shelter location. However, if a person is hit by a disaster while out in a place that the person is not well acquainted with, it takes this person time to evacuate as he or she does not know any shelter in that neighborhood. Even in places that they are well acquainted with, some people may have little grasp of shelter locations. The lamp system 100 can provide such people with evacuation information by drawing a pattern PTN_A that includes evacuation information and thus contributes to their safety.

The pattern PTN_A may include disaster information in addition to the evacuation information. Such a pattern PTN_A can inform people of a purpose of the evacuation. The pattern PTN_A may include only the disaster information. The pattern PTN_A may include the disaster information and the time when the disaster information was received.

The controller 130 may hold information on a plurality of shelter locations in advance. In this case, the controller 130 may, upon receiving information pertaining to a disaster, identify a shelter location for the current location, generate evacuation information indicating the shelter location and an evacuation route, and draw a pattern PTN_A including the evacuation information.

Alternatively, the controller 130 may receive evacuation information for the current location from the service described above and draw a pattern PTN_A including the received evacuation information.

A shelter location for the current location may be a shelter location closest to the current location, a plurality of shelter locations close to the current location, or all the shelter locations within a predetermined range (e.g., within one kilometer radius) of the current location.

Information on a shelter location that is full may be excluded. In other words, a shelter location for the current location may be a shelter location that is closest to the current location among those that are not full, a plurality of shelter locations that are close to the current location among those that are not full, or one or more shelter locations that are not full among all the shelter locations within a predetermined range of the current location. This configuration can prevent a situation where a person goes to a shelter location but cannot take a shelter there as it is full. Information indicating whether a shelter location is full may be received, for example, from the service described above.

The controller 130 may draw a pattern PTN_A when the vehicle speed is at a predetermined value (e.g., 10 km/h), or preferably when the vehicle is not moving. The controller 130 may draw a pattern PTN_B including information prompting the vehicle to stop if the vehicle speed exceeds the predetermined value. Information prompting the vehicle to stop may be, for example, a figure instructing the driver to stop, characters such as "STOP" or "PLEASE STOP" instructing the driver to stop, or characters such as "DISASTER INFORMATION RECEIVED" indicating that disaster information has been received.

As in the illustrated example, the controller 130 may draw a pattern PTN_A at a position where a person inside the vehicle 906, such as the driver or a passenger, can easily see the pattern PTN_A, or, for example, at a position where the pattern PTN_A is so spaced apart from the vehicle 906 as not to be blocked by the hood. The controller 130 may draw a pattern PTN_A at a position where a pedestrian 910 near the vehicle 906 can easily see the pattern PTN_A, that is, at a position near the vehicle 906.

The controller 130 may draw a pattern PTN_A in response to determining that the driver has gotten out of the vehicle 906. The controller 130 may determine that the driver has gotten out of the vehicle 906 based on the fact that a door was unlocked or a door was opened. In a case where the vehicle is provided with a sensor that detects whether the driver is in the driver's seat, the controller 130 may make a determination based on the detection result of this sensor.

The controller 130 may be configured to be capable of receiving information pertaining to a disaster while the ignition (IG) is off. If the controller 130 has received information pertaining to a disaster, the controller 130 may draw a pattern PTN_A even when the ignition (IG) is off. In this case, pedestrians can obtain evacuation information more easily.

The above describes a basic configuration of the lamp system 100. Now, an operation of the lamp system 100 will be described.

Figure 21:
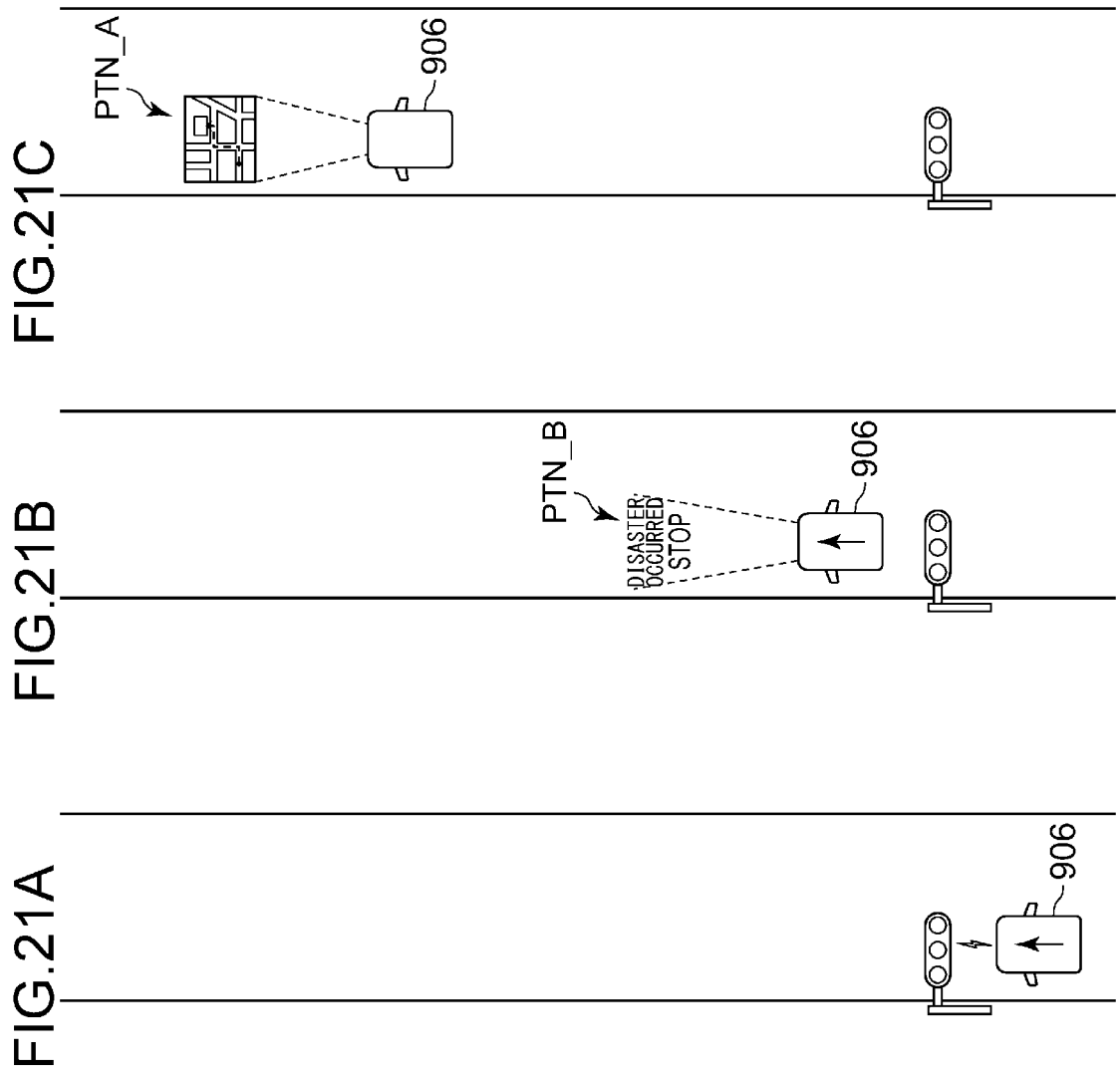
FIGS. 21A to 21C are illustrations for describing an example of how a lamp system draws a pattern.

FIGS. 21A to 21C are illustrations for describing an example of how the lamp system 100 draws a pattern PTN_A. FIGS. 21A to 21C show an operation of the lamp system 100 in time series.

In FIG. 21A, the vehicle 906 receives information pertaining to a disaster via road-to-vehicle communication. In FIG. 21B, no pattern PTN_A is drawn since the vehicle speed of the vehicle 906 exceeds a predetermined value, and a pattern PTN_B is drawn on the road surface 900. The pattern PTN_B includes information prompting the vehicle to stop. In this example, the information prompting the vehicle to stop includes characters stating "DISASTER OCCURRED" and "STOP." The pattern PTN_B may be displayed flashing.

In FIG. 21C, a pattern PTN_A is drawn since the vehicle 906 has stopped. The pattern PTN_A includes evacuation information. In addition, the pattern PTN_A is so drawn as to be easily visible to the driver.

Thus far, the present disclosure has been described on the basis of some embodiments. These embodiments are merely illustrative in nature, and it should be appreciated by a person skilled in the art that various modifications can be made to the combinations of the constituent elements and processing processes in the embodiments and that such variations also fall within the scope of the present disclosure. Such variations will be described below.

(Variation 4-1)

Figure 22:
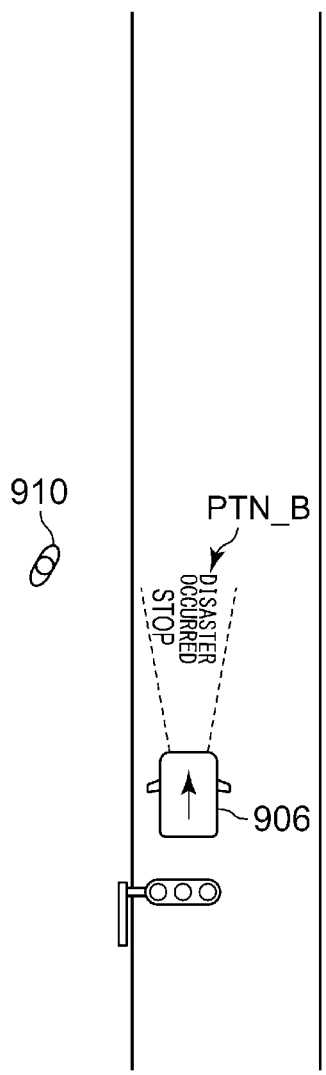
FIG. 22 illustrates a pattern according to a variation.

FIG. 22 illustrates a pattern PTN_B according to a variation. FIG. 22 corresponds to FIG. 21B. In the case described with reference to FIG. 21B, the information indicated by the pattern PTN_B is drawn in a proper orientation as viewed from the driver, that is, in such an orientation that allows the driver to see the information easily. In FIG. 22, the information indicated by the pattern PTN_B is drawn in a proper orientation as viewed from a pedestrian 910 on the sidewalk along the road surface 900 where the vehicle 906 travels, that is, in such an orientation that allows the pedestrian 910 to see the information easily, or more specifically, in an orientation where the pattern PTN_B illustrated in FIG. 21B is rotated by 90 degrees. This configuration can inform the pedestrian 910 that the vehicle 906 is to stop. Moreover, since characters stating "DISASTER OCCURRED" are drawn in FIG. 22, this can also inform the pedestrian 910 that a disaster has occurred.

(Variation 4-2)

Figure 23:
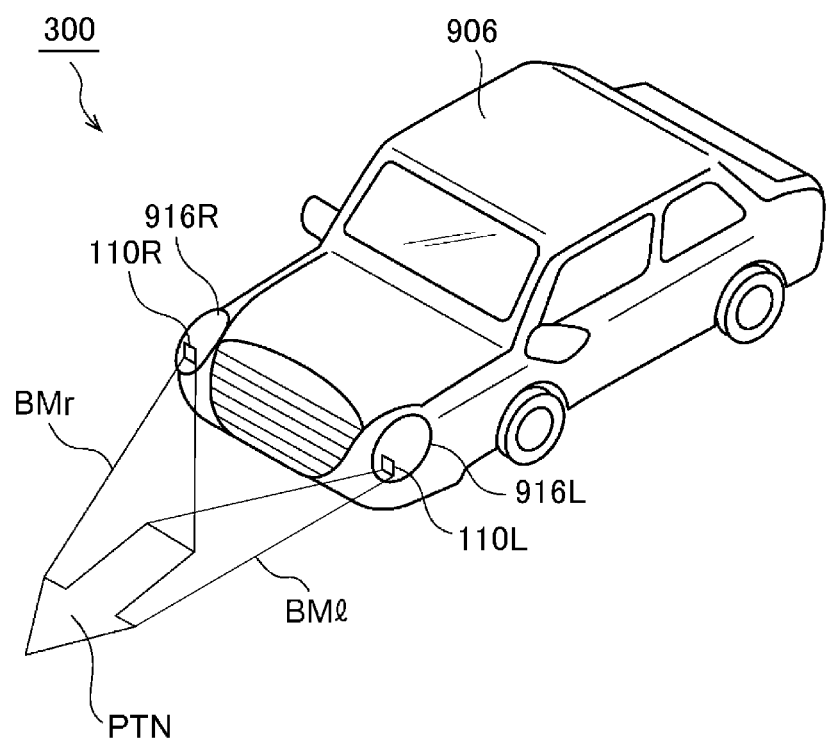
FIG. 23 is a schematic diagram illustrating a lamp system according to a variation.

FIG. 23 is a schematic diagram illustrating a lamp system 300 according to a variation. The lamp system 300 includes a first light distribution variable lamp 110L provided at the front left of the vehicle 906 and a second light distribution variable lamp 110R provided at the front right of the vehicle 906. Although the following is not limiting, the first light distribution variable lamp 110L and the second light distribution variable lamp 110R are, for example, embedded in a left headlamp 916L and a right headlamp 916R, respectively. The first light distribution variable lamp 110L and the second light distribution variable lamp 110R each have a configuration similar to the configuration of the light distribution variable lamp 110 according to Embodiment 4.

The first light distribution variable lamp 110L illuminates a road surface with a first beam BMl of a variable intensity distribution. The second light distribution variable lamp 110R illuminates the road surface with a second beam BMr of a variable intensity distribution. The first light distribution variable lamp 110L and the second light distribution variable lamp 110R may illuminate substantially the same illumination area and draw one pattern PTN with the two beams superposed on each other. Alternatively, the first light distribution variable lamp 110L and the second light distribution variable lamp 110R may illuminate separate illumination areas to draw separate patterns PTN with their respective beams.

Figure 24:
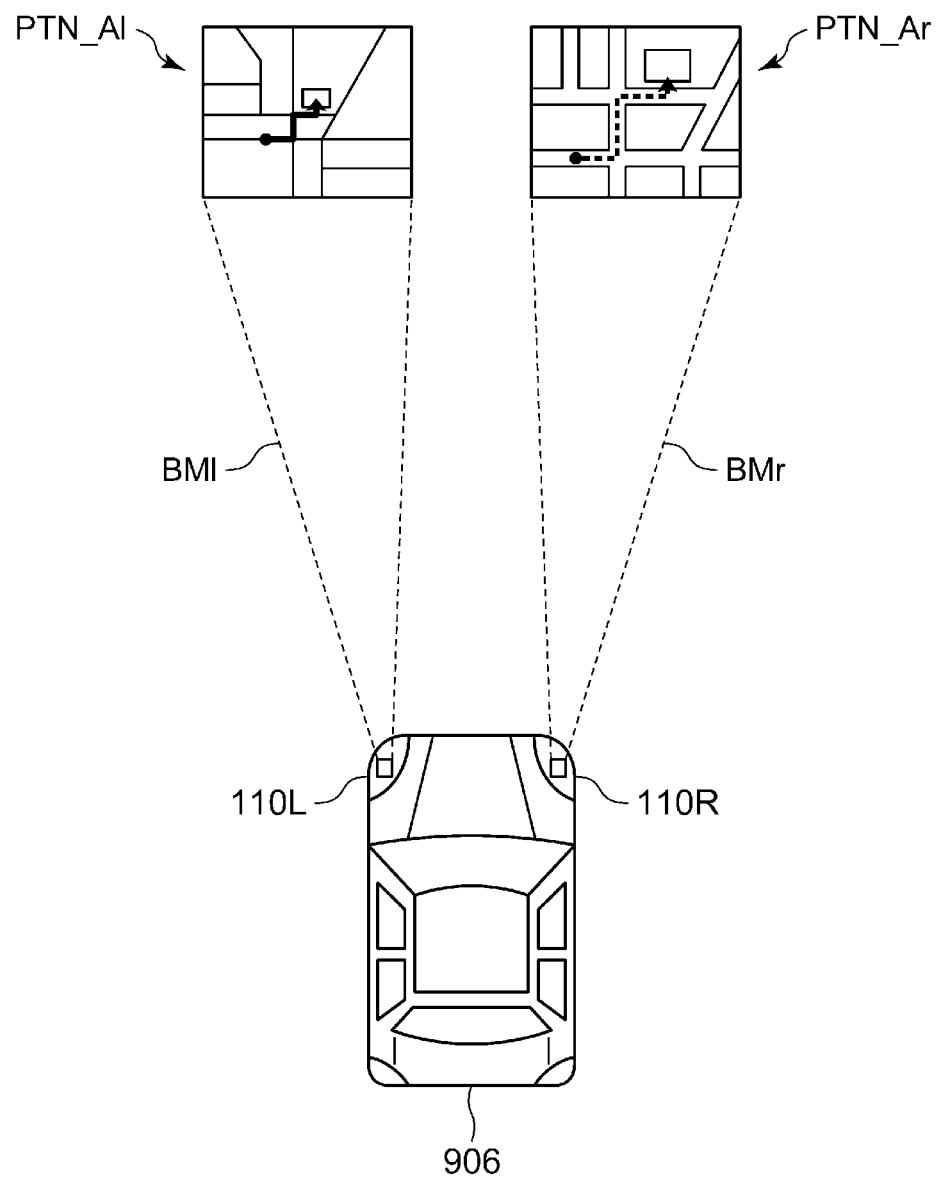
FIG. 24 is an illustration for describing an example of how the lamp system illustrated in FIG. 23 draws a pattern.

FIG. 24 is an illustration for describing an example of how the lamp system 300 illustrated in FIG. 23 draws a pattern. In this example, the first light distribution variable lamp 110L draws a first pattern PTN_Al on the road surface 900 with the first beam BMl, and the second light distribution variable lamp 110R draws a second pattern PTN_Ar with the second beam BMr. The first pattern PTN_Al and the second pattern PTN_Ar are each drawn at a different position on the road surface 900, that is, are drawn so as not to overlap each other on the road surface 900. The pattern PTN_A and the second pattern PTN_Ar each include a different piece of information. For example, one of the first pattern PTN_Al or the second pattern PTN_Ar includes a wide-area map indicating evacuation information, and the other of the two may include a detailed map indicating the evacuation information. In another example, one of the first pattern PTN_Al or the second pattern PTN_Ar includes disaster information (without evacuation information), and the other of the two includes the evacuation information (without the disaster information). This variation makes it possible to provide a larger amount of information.

Figure 25:
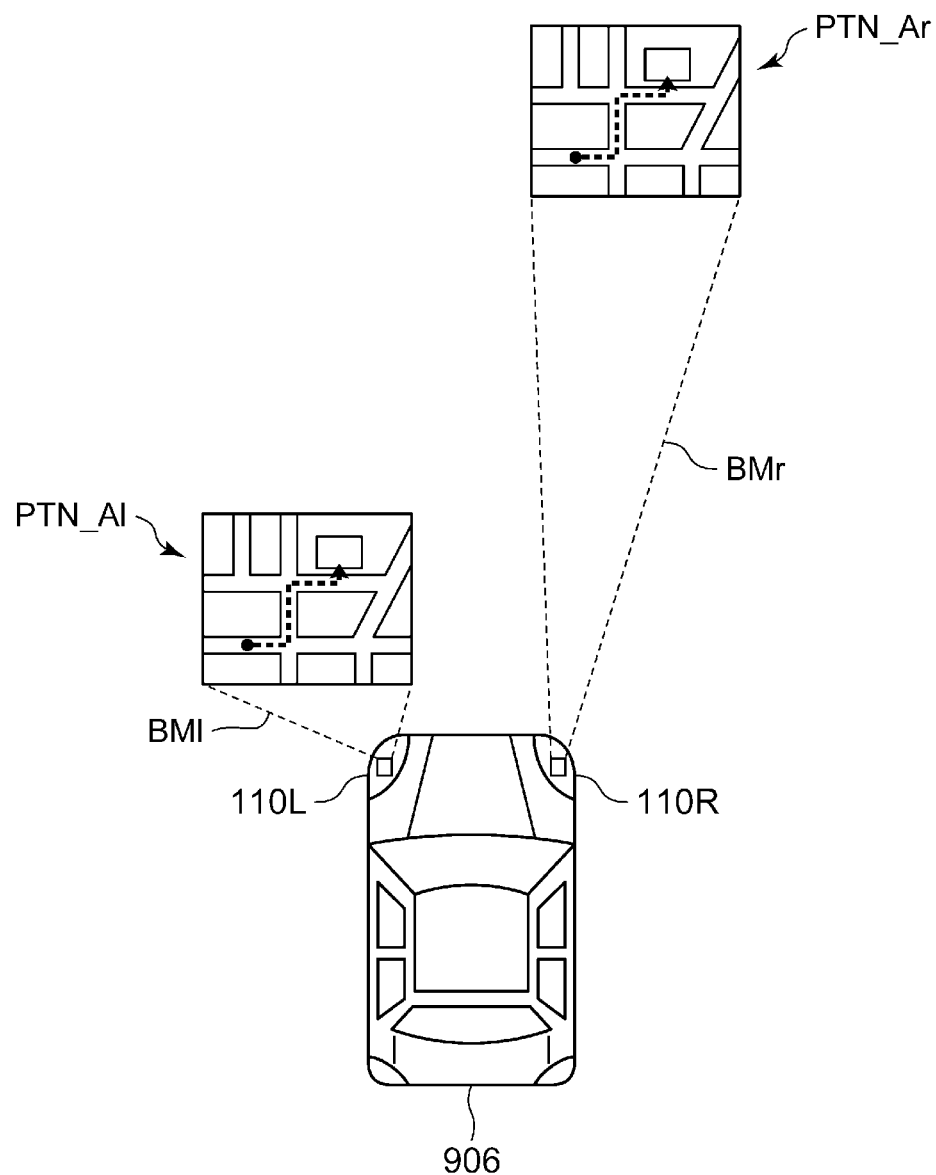
FIG. 25 is an illustration for describing another example of how of the lamp system illustrated in FIG. 23 draws a pattern.

FIG. 25 is an illustration for describing another example of how the lamp system 300 illustrated in FIG. 23 draws a pattern. The first pattern PTN_Al and the second pattern PTN_Ar are each drawn at a different position, or in particular, are drawn at positions with different distances from the vehicle. In this example, the second pattern PTN_Ar is drawn at a position further spaced apart from the vehicle than the first pattern PTN_Al. The first pattern PTN_Al and the second pattern PTN_Ar may include the same information or different pieces of information.

To be more specific, the first pattern PTN_Al is drawn near the vehicle. The first pattern PTN_Al is viewed by a pedestrian 910. For example, during the daytime, the first pattern PTN_Al is drawn in the shadow of the vehicle depending on the orientation of the vehicle. In this case, the first pattern PTN_Al can be seen more clearly than in a case where the first pattern PTN_Al is not drawn in the shadow of the vehicle, and the information can be provided to the pedestrian 910 more reliably. The first pattern PTN_Al may be drawn in an orientation rotated by 90 degrees so that a pedestrian on the sidewalk along the road surface can see the first pattern PTN_Al easily. Meanwhile, the second pattern PTN_Ar is drawn at a position where a person inside the vehicle can see the second pattern PTN_Ar easily, that is, drawn at a position where the second pattern PTN_Ar is so spaced apart from the vehicle 906 as not to be blocked by the hood when a person in the vehicle sees the second pattern PTN_Ar. This configuration makes it possible to provide the information to the person inside the vehicle more reliably.

(Variation 4-3)

The light distribution variable lamp 110 according to Embodiment 4 is a light source additional to the low beam and the high beam. Alternatively, the function of at least one of the low beam or the high beam may be integrated into the light distribution variable lamp 110.

While the preferred embodiments of the present disclosure have been described using specific terms, such description is for illustrative purposes only, and it is to be understood that changes and variations may be made without departing from the spirit or scope of the appended claims.

What is claimed is:

1. A lamp system, comprising:
   a road surface drawing lamp that illuminates a road surface with a beam; and
   a controller that controls the road surface drawing lamp and draws, with the beam, a pattern that includes two figures of each of which a lengthwise direction matches a traveling direction and an inner edge or an outer edge indicates a future course of a predetermined portion of a vehicle;
   wherein the inner edges of the figures indicate a future course of predetermined portions of tires, and the outer edges of the figures indicate a future course of outermost ends of a vehicle body in a widthwise direction of the vehicle or a future course of predetermined portions of mirrors.

2. The lamp system according to claim 1, wherein the predetermined portion of the vehicle is any of a predetermined portion of a tire, an outermost end of a vehicle body, or a predetermined portion of a mirror.

3. The lamp system according to claim 1, wherein brightness of the figure is reduced toward one side in a widthwise direction of the vehicle.

* * * * *